(12) United States Patent
Yoda et al.

(10) Patent No.: US 11,041,259 B2
(45) Date of Patent: Jun. 22, 2021

(54) FIBER INGREDIENT REPRODUCTION APPARATUS AND FIBER INGREDIENT REPRODUCTION METHOD

(71) Applicant: Seiko Epson Corporation, Tokyo (JP)

(72) Inventors: Kaneo Yoda, Okaya (JP); Yoshihiro Ueno, Shiojiri (JP); Shunichi Seki, Suwa (JP); Seiichi Taniguchi, Asahi-mura (JP)

(73) Assignee: Seiko Epson Corporation

( * ) Notice: Subject to any disclaimer, the term of this patent is extended or adjusted under 35 U.S.C. 154(b) by 187 days.

(21) Appl. No.: 16/225,904

(22) Filed: Dec. 19, 2018

(65) Prior Publication Data

US 2019/0186053 A1    Jun. 20, 2019

(30) Foreign Application Priority Data

Dec. 20, 2017  (JP) .............................. JP2017-244243

(51) Int. Cl.
*D01G 9/10* (2006.01)
*B01D 46/00* (2006.01)
*D01G 5/00* (2006.01)

(52) U.S. Cl.
CPC ........... *D01G 9/10* (2013.01); *B01D 46/0056* (2013.01); *D01G 5/00* (2013.01)

(58) Field of Classification Search
USPC ...................................................... 162/259
See application file for complete search history.

(56) References Cited

U.S. PATENT DOCUMENTS

| 2002/0144933 A1 | 10/2002 | Detampel |
| 2014/0290886 A1* | 10/2014 | Nagai ....................... D21F 9/02 |
| | | 162/252 |
| 2015/0204015 A1* | 7/2015 | Gomi .................. B29C 35/0277 |
| | | 162/261 |

FOREIGN PATENT DOCUMENTS

| JP | 2004-511344 A | 4/2004 |
| JP | 2015-137442 A | 7/2015 |
| JP | 2018-158513 A | 10/2018 |

\* cited by examiner

*Primary Examiner* — Mark Halpern
(74) *Attorney, Agent, or Firm* — Harness, Dickey & Pierce, P.L.C.

(57) ABSTRACT

A sheet fabrication apparatus includes: a fiber separation unit that micronizes an ingredient; a first sensor unit that measures a temperature in a first space including the fiber separation unit; a first air conditioning unit that adjusts the temperature in the first space; a fabrication unit that works the fiber separated articles obtained by micronizing the ingredient by the fiber separation unit; a second sensor unit that measures at least either a temperature or a humidity at a mounting position of the fabrication unit; and a control unit that controls the first air conditioning unit on the basis of at least any of measurement results of the first sensor unit and the second sensor unit.

8 Claims, 11 Drawing Sheets

FIBER INGREDIENT REPRODUCTION APPARATUS AND FIBER INGREDIENT REPRODUCTION METHOD

BACKGROUND

1. Technical Field

The present invention relates to a fiber ingredient reproduction apparatus and a fiber ingredient reproduction method.

2. Related Art

In the related art, an apparatus of reproducing an ingredient of old paper or the like is known (see JP-A-2015-137442, for example). Although such a type of apparatus includes a process of micronizing the ingredient, it is not easy to handle the micronized ingredient. According to the apparatus disclosed in JP-A-2015-137442, for example, a fiber separation unit performs fiber separation processing at a temperature that is lower than a glass transition point of an additive as a countermeasure against adhesion of fiber separated articles obtained by performing fiber separation on the ingredient.

In a case of reproducing the ingredient including fiber, it is preferable that the ingredient be further micronized in order to extract fiber to be reproduced from the ingredient at a high degree of purity. However, it becomes more difficult to handle the ingredient as the ingredient becomes finer, and there is a concern that processing efficiency is degraded. Therefore, a method for improving efficiency of a process of micronizing and processing the ingredient has been desired.

SUMMARY

An advantage of some aspects of the invention is to improve processing efficiency of an apparatus that micronizes and reproduces an ingredient that includes fiber.

According to an aspect of the invention, there is provided a fiber ingredient reproduction apparatus including: a micronizing unit that micronizes an ingredient; a first measurement unit that measures a temperature in a first space including the micronizing unit; a first air conditioning unit that adjusts the temperature in the first space; a working unit that works micronized articles, which are obtained by micronizing the ingredient by the micronizing unit, outside the first space; a second measurement unit that measures at least either a temperature or a humidity at a mounting position of the working unit; and a control unit that controls the first air conditioning unit on the basis of at least any of measurement results of the first measurement unit and the second measurement unit.

In this case, the temperature during the processing of micronizing (grinding or fiber separation) of the ingredient can be set to a temperature suitable for working the micronized articles or transporting the micronized articles to the working unit. It is possible to set the temperature of the ingredient during the processing of micronizing the ingredient and the temperature of the micronized articles transported to the working unit to be low by setting the temperature in the first space to be a low temperature. In this case, it is possible to increase brittleness of the ingredient and to efficiently separate colored components from the fiber contained in the ingredient. Also, dew condensation tends to occur on the micronized articles when the micronized articles are transported from the first space to the working unit that is located outside the first space. Therefore, humidity is applied (humidified) to the micronized articles, and it is thus possible to reduce influences of static electricity. As a result, it is possible to prevent condensation due to static electricity between the fiber contained in the micronized articles and particles other than the fiber and to improve efficiency of separating the fiber from components other than the fiber. It is possible to prevent or suppress adhesion of the fiber contained in the micronized articles and the particles other than the fiber to the inside of the micronizing unit or a path through which the fiber and the particles are transported from the micronizing unit to the working unit. Also, it is possible to prevent or suppress adhesion of the micronized articles due to static electricity during the process of processing the micronized articles. It is possible to improve processing efficiency of the ingredient or the micronized articles by adjusting the temperature in the first space in this manner.

In the apparatus, the control unit causes the first air conditioning unit to operate on the basis of the measurement result of the second measurement unit.

In this case, it is possible to adjust the temperature at which the ingredient is micronized in accordance with the temperature and/or the humidity at the mounting position of the working unit. Therefore, it is possible to improve efficiency of processing of the ingredient or the micronized articles.

In the apparatus, the second measurement unit is able to measure a temperature and a humidity at the mounting position of the working unit, and the control unit sets a target temperature in the first space on the basis of the temperature and the humidity measured by the second measurement unit and causes the first air conditioning unit to operate in accordance with the set target temperature.

In this case, it is possible to adjust the temperature at which the ingredient is micronized in accordance with both the temperature and the humidity at the mounting position of the working unit. Therefore, it is possible to further improve processing efficiency of the ingredient or the micronized articles.

In the apparatus, the control unit obtains a dew point temperature at the mounting position of the working unit on the basis of the measurement result of the second measurement unit and sets the target temperature in the first space to a temperature that is equal to or less than the dew point temperature.

In this case, since the temperature of the micronized articles transported from the micronizing unit to the working unit is a temperature that is equal to or less than the dew point temperature at the mounting position of the working unit, dew condensation occurs on the working unit. Therefore, it is possible to reduce influences of static electricity in relation to transport and processing of the micronized articles, to prevent condensation of the fiber contained in the micronized articles and the particles other than the fiber due to the static electricity, and to improve efficiency of separating the fiber from components other than the fiber. Also, it is possible to prevent or suppress adhesion of the fiber contained in the micronized articles and the particles other than the fiber to the inside of the micronizing unit or the path through which the fiber and the particles are transported from the micronizing unit to the working unit. In addition, it is possible to prevent or suppress adhesion of the micronized articles due to static electricity during the process of processing the micronized articles. Therefore, it is possible to improve processing efficiency of the micronized articles.

The apparatus further includes a second air conditioning unit that adjusts a temperature and a humidity in a second space that is a space in which the working unit is mounted, the second measurement unit measures at least either a temperature or a humidity in the second space, and the control unit controls the second air conditioning unit on the basis of target values set in advance for the temperature and the humidity in the second space and the measurement result of the second measurement unit.

In this case, it is possible to adjust the temperature and the humidity in the space in which the working unit is mounted on the basis of the target value, and for example, it is possible to match the temperature and the humidity with target values. Therefore, it is possible to prevent condensation of the fiber contained in the micronized articles and the particles other than the fiber due to static electricity by adjusting the temperature and the humidity to a temperature and a humidity at which dew condensation tends to occur on the micronized articles in the second space, for example, and to improve efficiency of separating the fiber and the components other than the fiber. Also, it is possible to prevent or suppress adhesion of the fiber contained in the micronized articles and the particles other than the fiber to the inside of the micronizing unit and the path through which the fiber and the particles are transported from the micronizing unit to the working unit. Also, it is possible to prevent or suppress adhesion of the micronized articles due to static electricity during the process of processing the micronized articles. It is possible to improve the processing efficiency of the micronized articles by adjusting the temperature and the humidity in the second space in this manner.

In the apparatus, the micronizing unit includes at least either a shredding device that shreds the ingredient in a sheet form and a fiber separation machine that performs fiber separation on the ingredient to obtain the ingredient in a fiber form.

In this case, it is possible to improve processing efficiency of the shredding device and the fiber separation machine and to enhance efficiency of transporting pieces shredded by the shredding device and fiber separated particles obtained through fiber separation by the fiber separation machine.

The apparatus further includes a first case body that accommodates the micronizing unit, and the first measurement unit measures the temperature in the first space that is an inner space of the first case body.

In this case, it is possible to reliably perform the measurement of the temperature and the humidity in the space in which the micronizing unit is located and the adjustment of the temperature using the first air conditioning unit with the configuration in which the micronizing unit is accommodated in the first case body.

The apparatus further includes a second case body that accommodates the working unit, and the second measurement unit measures at least either a temperature and a humidity in an inner space of the second case body.

In this case, it is possible to reliably measure the temperature and the humidity at the position of the working unit with the configuration in which the working unit is accommodated in the second case body.

In the apparatus, the working unit has a classification unit that classifies the micronized articles, and the classification unit is accommodated in the second case body.

In this case, it is possible to reliably measure the temperature and the humidity at the position at which the micronized articles are classified.

According to another aspect of the invention, there is provided a fiber ingredient reproduction method including: micronizing an ingredient; measuring a temperature in a first space in which the micronizing process is executed; working micronized articles which are obtained by micronizing the ingredient in the micronizing of the ingredient; measuring at least either a temperature or a humidity at a position at which the working of the micronized articles is executed; and adjusting a temperature in the first space on the basis of at least any of measurement results of the measuring of the temperature and the measuring of the temperature or the humidity.

In this case, it is possible to set the temperature during the processing of micronizing the ingredient to a temperature that is suitable for working the micronized articles or transporting the micronized articles to the working unit. It is possible to set the temperature of the ingredient during the micronizing process and the temperature of the micronized articles transported to the working process to be low by setting the temperature in the first space to a low temperature through the temperature adjustment process, for example. In this case, it is possible to increase brittleness of the ingredient and to efficiently separate colored components from the fiber contained in the ingredient. Also, dew condensation tends to occur on the micronized articles in the working process. Therefore, it is possible to reduce influences of static electricity, to prevent condensation of the fiber contained in the micronized articles and the particles other than the fiber due to the static electricity, and to improve efficiency of separating the fiber from components other than the fiber. Also, it is possible to prevent or suppress adhesion of the fiber contained in the micronized articles and the particles other than the fiber to the inside of the micronizing unit or the path through which the particles are transported from the micronizing unit to the working unit. In addition, it is possible to prevent or suppress adhesion of the micronized articles due to static electric during the process of processing the micronized articles. Therefore, it is possible to improve processing efficiency of the ingredient or the micronized articles by adjusting the temperature through the temperature adjustment process.

BRIEF DESCRIPTION OF THE DRAWINGS

The invention will be described with reference to the accompanying drawings, wherein like numbers reference like elements.

DESCRIPTION OF EXEMPLARY
EMBODIMENTS

Hereinafter, preferred embodiments of the invention will be described in detail with reference to drawings. Note that the embodiments described below are not intended to limit the content of the invention described in the claims. Also, not all the configurations described below are necessarily essential configurational requirements of the invention.

1. First Embodiment 1-1. Overall Configuration of Sheet Fabrication Apparatus

Figure 1:
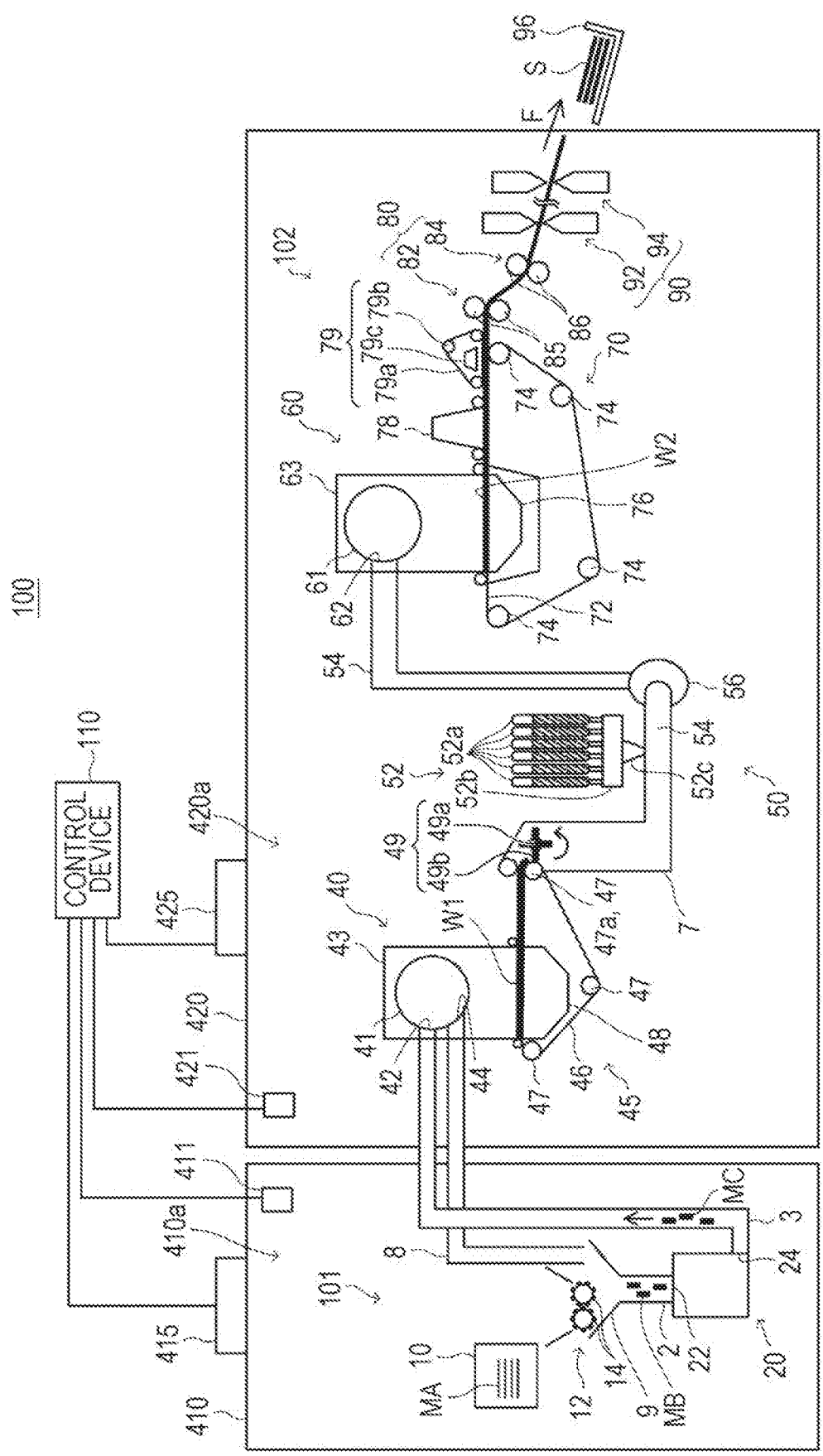
FIG. 1 is a schematic view illustrating a configuration of a sheet fabrication apparatus according to a first embodiment.

FIG. 1 is a schematic diagram illustrating a configuration of a sheet fabrication apparatus 100 according to a first embodiment to which the invention is applied.

The sheet fabrication apparatus 100 includes a supply unit 10, a rough grinding unit 12, a fiber separation unit 20, a sorting unit 40, a first web formation unit 45, a rotating body 49, a mixing unit 50, a piling unit 60, a second web formation unit 70, a transport unit 79 a sheet formation unit 80, and a cutting unit 90 as illustrated in FIG. 1. The rough grinding unit 12, the fiber separation unit 20, the sorting unit 40, and the first web formation unit 45 form a fiber separation processing unit 101. Also, the rotating body 49, the mixing unit 50, the piling unit 60, the second web formation unit 70, the sheet formation unit 80, and the cutting unit 90 form a fabrication unit 102 that processes materials obtained by the fiber separation processing unit 101, thereby manufacturing a sheet S.

The sheet fabrication apparatus 100 corresponds to the fiber ingredient reproduction apparatus according to the invention and executes reproduction processing of transforming the ingredient containing fiber into fiber and reproducing the fiber as a new sheet. The sheet fabrication apparatus 100 fabricates a plurality of types of sheets by performing soft-type fiber separation on the ingredient to obtain fiber and then pressurizing, heating, and cutting the fiber. Here, it is possible to improve sheet bonding strength or whiteness or to add functions such as a color, fragrant, incombustibility, and the like by mixing various additives into the ingredient that has transformed into fiber. Also, it is possible to fabricate and sell a variety of types of sheets using the sheet fabrication apparatus 100 by controlling density, thicknesses, sizes, and shapes and shaping them. As the sheets, it is possible to fabricate sheets formed into paper dish shapes in addition to sheet-form products such as A4 or A3 print sheets, cleaning sheets (such as floor cleaning sheets), sheets for oil contamination, and toilet cleaning sheets. In the embodiment, an example in which the sheet fabrication apparatus 100 fabricates a sheet S that is a print sheet will be described.

The supply unit 10 supplies an ingredient MA for the sheet fabrication apparatus 100 fabricating the sheet S to a rough grinding unit 12. Operations of the supply unit 10 correspond to the ingredient supply process. Any ingredient MA may be employed as long as it contains fiber, and for example, it is possible to exemplify paper, pulp, a pulp sheet, a cloth including a non-woven cloth, a woven fabric, and the like. The ingredient for the sheet fabrication apparatus 100 may be a used ingredient such as waste paper (so-called old paper) or may be an unused ingredient. The following description will be given by exemplifying a case in which the sheet fabrication apparatus 100 uses waste paper as an ingredient.

The supply unit 10 includes a tray (not illustrated) that accommodates the ingredient MA that the user inputs, a roller (not illustrated) that feeds the ingredient MA from the tray, and a motor (not illustrated) that drives the roller. The supply unit 10 feeds the ingredient MA to the rough grinding unit 12 through a motor's operation.

The rough grinding unit 12 shreds the ingredient MA, which has been supplied by the supply unit 10, in the air and changes it into a roughly ground pieces MB in thin strip shapes. The shapes and the sizes of the roughly ground pieces MB are thin strips of several centimeters, for example. In the example illustrated in the drawing, the rough grinding unit 12 has a rough grinding blade 14 and can shred the input ingredient MA using the rough grinding blade 14. A shredder is used, for example, as the rough grinding unit 12. The rough ground pieces MB shredded by the rough grinding unit 12 is received by a hopper 9 and is then transferred (transported) to the fiber separation unit 20 via a pipe 2.

The fiber separation unit 20 performs fiber separation on the roughly ground pieces MB. Here, "performing fiber separation" means loosening the roughly ground pieces MB (articles as targets of fiber separation), in which a plurality of fiber pieces are bonded, into fiber pieces one by one. The fiber separation unit 20 also has a function of separating articles such as resin particles, ink, toner, or a bleeding inhibitor, which has adhered to the fiber contained in the roughly ground pieces MB, from the fiber.

Articles that have passed through the fiber separation unit 20 will be referred to as "fiber separated articles" (hereinafter, fiber separated articles MC). The fiber separated articles MC may contain resin (resin for bonding a plurality of fiber pieces) particles separated from the fiber when the fiber is loosened, a colorant such as ink or toner, o an additive such as a bleeding inhibiting material or a paper strength enhance in addition to the loosened fiber separated article fiber in some cases. The shape of the fiber contained in the fiber separated articles MC, that is, the loosened fiber separated article fiber is a string shape or a ribbon shape. The fiber separated article fiber contained in the fiber separated articles MC may be present in a state in which the fiber separated article fiber is entangled with other loosened fiber (independent state) or may be present in a state in which the fiber separated article fiber is entangled with other loosened fiber separated article and is in a lump shape (in a state in which the fiber separated article fiber forms so-called lump).

The fiber separation unit 20 performs dry-type fiber separation. Here, performing processing such as fiber separation in the ambient air (in the air) rather than liquid is referred to as a dry type. The fiber separation unit 20 can be formed using a fiber separation machine such as an impeller mill, for example. Specifically, the fiber separation unit 20 includes a rotor (not illustrated) that rotates at a high speed and a liner (not illustrated) that is located at an outer periphery of the rotor. With this configuration, the roughly ground pieces MB sent from the rough grinding unit 12 through the pipe 2 are subjected to fiber separation while being interposed between the rotor and the liner of the fiber separation unit 20.

The fiber separation unit 20 suctions the roughly ground pieces MB and causes an air flow for discharging the fiber separated articles. In this manner, the fiber separation unit 20 can suction the roughly ground pieces MB along with the air flow from an inlet port 22, perform fiber separation thereon, and transport the fiber separated articles to a discharge port 24. The fiber separated articles that have passed through the fiber separation unit 20 are transferred to the sorting unit 40 via a pipe 3. Note that as the air flow for transporting the fiber separated articles from the fiber separation unit 20 to the sorting unit 40, an air flow that the fiber separation unit 20 causes may be used or an air flow generation device such as a blower may be provided to use an air flow thereof.

The rough grinding unit 12 corresponds to the shredding device while the fiber separation unit 20 corresponds to the fiber separation machine. The rough grinding unit 12 and the fiber separation unit 20 form the fiber separation processing unit 101 and correspond to the micronizing unit according to the invention. The processing of roughly grinding the ingredient MA using the rough grinding unit 12 and/or the processing of performing fiber separation on the roughly ground pieces MB using the fiber separation unit 20 correspond to the micronizing and the micronizing process. The roughly ground pieces MB shredded by the rough grinding unit 12 and the fiber separated articles MC obtained through the fiber separation by the fiber separation unit 20 correspond to the micronized articles. In other words, the micronizing unit corresponds to any one of or both the rough grinding unit 12 and the fiber separation unit 20 while the micronized article corresponds to any one of or both the roughly ground pieces MB and the fiber separated articles MC. In a configuration in which the sheet fabrication apparatus 100 does not include the rough grinding unit 12 and the supply unit 10 supplies the ingredient MA to the fiber separation unit 20, for example, the fiber separation unit 20 corresponds to the micronizing unit while the fiber separated articles MC correspond to the micronized articles.

The sorting unit 40 introduces the fiber separated article MC from the inlet port 42 and sorts components contained in the fiber separated articles MC depending on sizes. The sizes mean, for example, lengths of the fiber contained in the fiber separated articles MC. The sorting unit 40 has a drum unit 41 and a housing unit 43 that accommodates the drum unit 41. As the drum unit 41, a filter is used, for example. The drum unit 41 has a net (a filter, a screen) and can divide fiber or particles (that pass through the net; first sorted articles) that are smaller than the size of the mesh of the net from fiber, non-fiber-separated pieces, or lamps (that does not pass through the net; second sorted articles) that are larger than the size of the mesh of the net. The sorting unit 40 corresponds to the classification unit.

For example, the first sorted articles from among the articles sorted by the sorting unit 40 are transferred to the mixing unit 50 via a pipe 7. The second sorted articles are returned to the fiber separation unit 20 from a discharge port 44 via a pipe 8. Specifically, the drum unit 41 is a cylindrical filter that is driven to rotate by a motor. A metal net, expanded metal obtained by expanding a metal plate with cut lines, punching metal obtained by forming holes in a metal plate with a press machine or the like, for example, is used as the net of the drum unit 41.

Note that the configuration in which the sheet fabrication apparatus 100 sorts and separates the first sorted articles from the second sorted articles, that is, the configuration of the classification unit is not limited to the sorting unit 40 illustrated in FIG. 1. For example, a configuration in which a classification machine classifies the fiber separated articles obtained through the fiber separation by the fiber separation unit 20 may be employed. As the classification machine, a cyclone classification machine, an elbow-jet classification machine, or an Eddy classifier, for example, can be used. It is possible to sort and separate the first sorted articles from the second sorted articles by using such a classification machine. Further, it is possible to realize a configuration of separating and removing articles to be removed, which contain relatively small or relatively low-density fiber separated articles (such as resin particles, a colorant, and additives), by the aforementioned classification machine. For example, a configuration of removing fine particles contained in the first sorted articles from the first sorted articles by the classification machine may be employed. In this case, a configuration in which the second sorted articles are returned to the fiber separation unit 20, the removed articles are collected by a dust collecting unit (not illustrated), and the first sorted articles excluding the removed articles are sent to the pipe 7, for example, can be employed.

The first web formation unit 45 transports the first sorted articles, which have passed through the sorting unit 40, to the mixing unit 50. The first web formation unit 45 includes a mesh belt 46, a stretching roller 47, and a suctioning unit 48.

The suctioning unit 48 can suction the first sorted articles, which have passed through openings (openings of the net) of the sorting unit 40 and have been dispersed into the air, onto the mesh belt 46. The first sorted articles are deposited on the moving mesh belt 46 and form a first web W1. Basic configurations of the mesh belt 46, the stretching roller 47, and the suctioning unit 48 are similar to those of a mesh belt 72, a stretching roller 74, and a suctioning mechanism 76 of a second web formation unit 70, which will be described later.

The first web W1 is formed in a state in which the first web W1 contains a large amount of air and softly swells out by passing through the sorting unit 40 and the first web formation unit 45. The first web W1 deposited on the mesh belt 46 is input to the pipe 7 and is then transported to the mixing unit 50.

The rotating body 49 can cut the first web W1 before the first web W1 is transported to the mixing unit 50. In the example illustrated in the drawing, the rotating body 49 has base portions 49a and projecting portions 49b that project from the base portion 49a. The projecting portions 49b have plate-like shapes, for example. In the example illustrated in the drawing, four projecting portions 49b are provided, and four projecting portions 49b are provided at equal intervals. The projecting portions 49b can rotate by using the base portions 49a as axes by the base portions 49a rotating in a direction R. For example, it is possible to reduce variations in the amount of the fiber separated articles supplied to the piling unit 60 per unit time, for example, by the rotating body 49 cutting the first web W1.

The rotating body 49 is provided in the vicinity of the first web formation unit 45. In the example illustrated in the drawing, the rotating body 49 is provided in the vicinity of a stretching roller 47a (near the stretching roller 47a) positioned on the downstream side in the path of the first web W1. The rotating body 49 is provided at a location at which the projecting portions 49b can be in contact with the first web W1 and a location at which the projecting portions 49b are not brought into contact with the mesh belt 46 where the first web W1 is deposited. In this manner, it is possible to suppress abrasion (breakage) of the mesh belt 46 due to the projecting portions 49b. The shortest distance between the projecting portions 49b and the mesh belt 46 is equal to or greater than 0.05 mm and equal to or less than 0.5 mm, for example, and is a distance with which it is possible to cut the first web W1 without damaging the mesh belt 46.

The mixing unit 50 mixes the first sorted articles (the first sorted articles transported by the first web formation unit 45) that have passed through the sorting unit 40 with an additive containing resin.

The mixing unit 50 has an additive supply unit 52 that supplies the additive, a pipe 54 that transports the first sorted articles and the additive, and a mixing blower 56. In the example illustrated in the drawing, the additive is supplied from the additive supply unit 52 to the pipe 54 via the hopper 9. The pipe 54 continues to the pipe 7.

An additive cartridge 52a for accumulating the additive is set at the additive supply unit 52. The additive cartridge 52a can be attached to and detached from the additive supply unit 52. The additive supply unit 52 includes an additive extracting unit 52b that extracts the additive from the additive cartridge 52a and an additive input unit 52c that discharges the additive extracted by the additive extracting unit 52b to the pipe 54. The additive extracting unit 52b includes a feeder (not illustrated) that let the additive, which is fine powder or fine particles, out from the inside of the additive cartridge 52a and extracts the additive from a part or entirety of additive cartridge 52a. The additive extracted by the additive extracting unit 52b is sent to the additive input unit 52c. The additive input unit 52c accommodates the additive that the additive extracting unit 52b has extracted. The additive input unit 52c includes a shutter (not illustrated), which can open and close, at a portion coupling to the pipe 54, and the additive that the additive extracting unit 52b has extracted is sent to the pipe 54 by opening the shutter.

The additive supplied from the additive supply unit 52 contains resin (binder) for binding a plurality of fiber pieces. The plurality of fiber pieces are not bonded at the timing at which the resin is supplied. The resin melts and bonds the plurality of fiber pieces when the resin passes through the sheet formation unit 80.

The resin supplied from the additive supply unit 52 is thermoplastic resin or thermosetting resin, and examples thereof include AS resin, ABS resin, polypropylene, polyethylene, polyvinyl chloride, polystyrene, acrylic resin, polyester resin, polyethylene terephthalate, polyphenylene ether, polybutylene terephthalate, nylon, polyamide, polycarbonate, polyacetal, polyphenylene sulfide, polyether ether ketone, and the like. The resin may be used alone or may be appropriately mixed and used. The additive supplied from the additive supply unit 52 may be in a fiber form or a powder form.

Note that the additive supplied from the additive supply unit 52 may contain other components of resin for bonding fiber. For example, a colorant for coloring the fiber, a condensation inhibitor for suppressing condensation of the fiber or condensation of the resin, and a flame retardant for causing the fiber and the like to be non-flammable may be contained in accordance with the type of sheet to be fabricated. The mixture (the mixture of the first sorted articles and the additive) that has passed through the mixing unit 50 is transferred to the piling unit 60 via the pipe 54.

The mixing unit 50 can cause an air flow by the mixing blower 56 and transport the first sorted articles and the additive while mixing them in the pipe 54. Note that the mechanism for mixing the first sorted articles with the additive is not particularly limited and may be a mechanism of stirring them with a blade that rotates at a high speed or may be a mechanism using rotation of a container, such as a V-type mixer.

The piling unit 60 introduces the mixture, which has passed through the mixing unit 50, from the inlet port 62, loosens the entangled fiber separated articles (fiber), and causes the fiber separated articles to drop while dispersing then in the air. Further, the piling unit 60 loosens the entangled resin in a case in which resin of the additive supplied from the additive supply unit 52 is in the fiber form. In this manner, the piling unit 60 can uniformly deposit the mixture on the second web formation unit 70.

The piling unit 60 has a drum unit 61 and a housing unit 63 that accommodates the drum unit 61. As the drum unit 61, a rotating cylindrical filter is used. The drum unit 61 has a net and causes fiber or particles (that pass through the net) that are contained in the mixture that has passed through the mixing unit 50 and are smaller than the mesh of the net. The configuration of the drum unit 61 is the same as the configuration of the drum unit 41, for example.

Note that the "filter" of the drum unit 61 may not have the function of sorting specific targets. That is, the "filter" used as the drum unit 61 means a unit provided with a net, and the drum unit 61 may cause the entire mixture introduced into the drum unit 61 to drop.

The second web formation unit 70 deposits the passing articles that have passed through the piling unit 60 and forms a second web W2. The second web formation unit 70 has a mesh belt 72, a stretching roller 74, and a suctioning mechanism 76, for example.

The mesh belt 72 deposits the passing articles that have passed through openings (openings of the net) of the piling unit 60 while moving. The mesh belt 72 is stretched by the stretching roller 74 and is configured such that the mesh belt 72 does not tend to cause the passing articles to pass therethrough while causing the air to pass therethrough. The mesh belt 72 moves by the stretching roller 74 spinning. The second web W2 is formed on the mesh belt 72 by the mesh belt 72 continuously moving and the passing articles, which have passed through the piling unit 60, continuously dropping and piling thereon. The mesh belt 72 is made of metal, resin, a cloth, or a non-woven cloth, for example.

The suctioning mechanism 76 is provided below the mesh belt 72 (on the side opposite to the side of the piling unit 60). The suctioning mechanism 76 can cause an air flow directed downward (an air flow directed from the piling unit 60 to the mesh belt 72). It is possible to suction the mixture, which is dispersed in the air by the piling unit 60, onto the mesh belt 72 by the suctioning mechanism 76. In this manner, it is possible to increase the speed of discharge from the piling unit 60. Further, it is possible to form a down flow in the mixture dropping path by the suctioning mechanism 76 and to prevent the fiber separated articles and the additive from being entangled during the dropping.

As described above, the second web W2 in a state in which the second web W2 contains a large amount of air and swells out is formed by passing through the piling unit 60 and the second web formation unit 70. The second web W2 deposited on the mesh belt 72 is transported to the sheet formation unit 80.

Note that in the example illustrated in the drawing, a humidity adjustment unit 78 that adjusts a moisture of the second web W2 is provided. The humidity adjustment unit 78 can adjust the ratio of the amounts between the second web W2 and water by adding water or water vapor to the second web W2.

The sheet formation unit 80 shapes the sheet S by pressurizing and heating the second web W2 (deposited articles) deposited on the mesh belt 72. The sheet formation unit 80 can bond the plurality of fiber pieces in the mixture to each other via the additive (resin) by applying a heat to the mixture of the fiber separated articles and the additive mixed in the second web W2.

The sheet formation unit 80 includes a pressurizing unit 82 that pressurizes the second web W2 and a heating unit 84 that heats the second web W2 pressurized by the pressurizing unit 82. The pressurizing unit 82 includes a pair of calendar rollers 85 and applies a pressure to the second web W2. The second web W2 has a thickness that is reduced in accordance with the pressurization, and the density of the second web W2 is increased. For example, a heating roller (heater roller), a heat press molding machine, a hot plate, a hot wind blower, an infrared heater, a flash fixer is used as the heating unit 84. In the example illustrated in the drawing, the heating unit 84 includes a pair of heating rollers 86. It is possible to shape the sheet S while continuously transporting the second web W2 by forming the heating unit 84 as the heating rollers 86 as compared with a case in which the heating unit 84 is formed as a plate-like press device (flat press device). Here, the calendar roller 85 (pressurizing unit 82) can apply a pressure that is higher than a pressure to be applied to the second web W2 by the heating roller 86 (heating unit 84) to the second web W2. Note that the number of the calendar rollers 85 and the heating rollers 86 are not particularly limited.

The cutting unit 90 cuts the sheet S shaped by the sheet formation unit 80. In the example illustrated in the drawing, the cutting unit 90 has a first cutting unit 92 that cuts the sheet S in a direction that intersects a transport direction of the sheet S and a second cutting unit 94 that cuts the sheet S in a direction parallel to the transport direction. The second cutting unit 94 cuts the sheet S that has passed through the first cutting unit 92, for example.

As described above, a single piece of sheet S with a predetermined size is shaped. The cut single piece of sheet S is discharged to the discharge unit 96. The discharge unit 96 includes a tray or a stacker on which the fabricated sheet is accommodated, and the sheet S discharged to the tray can be extracted and used by a user.

At least any of the sorting unit 40, the first web formation unit 45, the rotating body 49, the mixing unit 50, the piling unit 60, the second web formation unit 70, the transport unit 79, the sheet formation unit 80, and the cutting unit 90 corresponds to the working unit. That is, entirety or a part of the fabrication unit 102 corresponds to the working unit that processes the roughly ground pieces MB micronized by the rough grinding unit 12 and the fiber separated articles MC micronized by the fiber separation unit 20 in the sheet fabrication apparatus 100.

The sheet fabrication apparatus 100 has a first chamber 410 (first case body) that accommodates at least any of the rough grinding unit 12 and the fiber separation unit 20 corresponding to the micronizing unit. The first chamber 410 according to the embodiment accommodates the rough grinding unit 12 and the fiber separation unit 20. The first chamber 410 is a hollow case body and is formed into a box shape, for example, and the rough grinding unit 12 and the fiber separation unit 20 are accommodated in a first space 410a that is an inner space of the first chamber 410. Also, the supply unit 10 may be accommodated in the first chamber 410. As illustrated in FIG. 1, a part or entirety of the pipes (pipes 2, 3, and 8) connected to the rough grinding unit 12 and the fiber separation unit 20 is also accommodated in the first chamber 410.

The sheet fabrication apparatus 100 has a first sensor unit 411 (first measurement unit). The first sensor unit 411 is provided in the first chamber 410 and includes a temperature sensor 412 (FIG. 2) and a humidity sensor 413 (FIG. 2) as will be described later. The temperature sensor 412 is a sensor that measures a temperature in the first space 410a while the humidity sensor 413 is a sensor that measures a humidity in the first space 410a. As will be described later, the first sensor unit 411 is connected to the control device 110 and outputs measurement values of the temperature and the humidity measured in the first space 410a to the control device 110.

The sheet fabrication apparatus 100 has a second chamber 420 (second case body) that accommodates at least any of working units. The second chamber 420 according to the embodiment accommodates the respective parts that form the fabrication unit 102. The second chamber 420 is a hollow case body and is formed into a box shape, for example, and the fabrication unit 102 is accommodated in a second space 420a that is an inner space of the second chamber 420.

The sheet fabrication apparatus 100 has a second sensor unit 421 (second measurement unit). The second sensor unit 421 is provided in the second chamber 420 and includes a temperature sensor 422 (FIG. 2) and a humidity sensor 423 (FIG. 2) as will be described later. The temperature sensor 422 is a sensor that measures a temperature in the second space 420a while the humidity sensor 423 is a sensor that measures a humidity in the second space 420a. As will be described later, the second sensor unit 421 is connected to the control device 110 and outputs measurement values of the temperature and the humidity measured in the second space 420a to the control device 110.

Note that the first chamber 410 may be any container capable of sectioning the first space 410a from the outside. Similarly, the second chamber 420 may be any container capable of sectioning the second space 420a from the outside. The shapes of the first chamber 410 and the second chamber 420 may be box shapes, tubular shapes, or more complicated shapes.

Although the first space 410a is a space distinguished from the outside of the first chamber 410, the air may be distributed between the outer space and the first space 410a. That is, it is only necessary for the temperature (air temperature) in the first space 410a to be maintained at a temperature that is different from that in the outer space of the first chamber 410, complete air tightness does not have to be kept, and the first chamber 410 may have an opening, for example. Similarly, it is only necessary for the temperature (air temperature) and the humidity in the second space 420a of the second chamber 420 to be maintained at a temperature and a humidity that are different from those in the outer space of the second chamber 420, complete air tightness does not have to be kept, and the second chamber 420 may have an opening, for example.

A first air conditioning unit 415 is provided in the first chamber 410 while a second air conditioning unit 425 is provided in the second chamber 420.

The first air conditioning unit 415 is an air conditioning device that operates in accordance with control of the control device 110 and adjusts the temperature and/or the humidity in the first space 410a. The first air conditioning unit 415 includes at least a mechanism for cooling the first space 410a. For example, the first air conditioning unit 415 is a Peltier-type cooling device or a heat pump-type freezer provided with a compressor, a condenser, and an evaporator. The first air conditioning unit 415 may include a mechanism for heating or humidifying the first space 410a, and for example, the first air conditioning unit 415 may include various heaters that humidify the air using electricity or a heat pump-type heater. Also, the first air conditioning unit 415 may include a mechanism for adjusting the humidity in the first space 410a, and for example, the first air conditioning unit 415 may include a mist-type humidifier or a vaporizing humidifier.

The second air conditioning unit 425 is an air conditioning device that operates in accordance with control of the control device 110 and adjusts the temperature and the humidity in the second space 420a. The second air conditioning unit 425 has a function of adjusting the temperature in the second space 420a. For example, the second air conditioning unit 425 includes a Peltier-type cooling device that cools the second space 420a, various heaters that humidify the air using electricity for heating the second space 420a, or a heat pump that heats and cools the second space 420a. The second air conditioning unit 425 includes a mist-type humidifier or a vaporizing humidifier, for example, as a mechanism that adjusts the humidity in the second space 420a.

1-2. Configuration of Control Device

Figure 2:
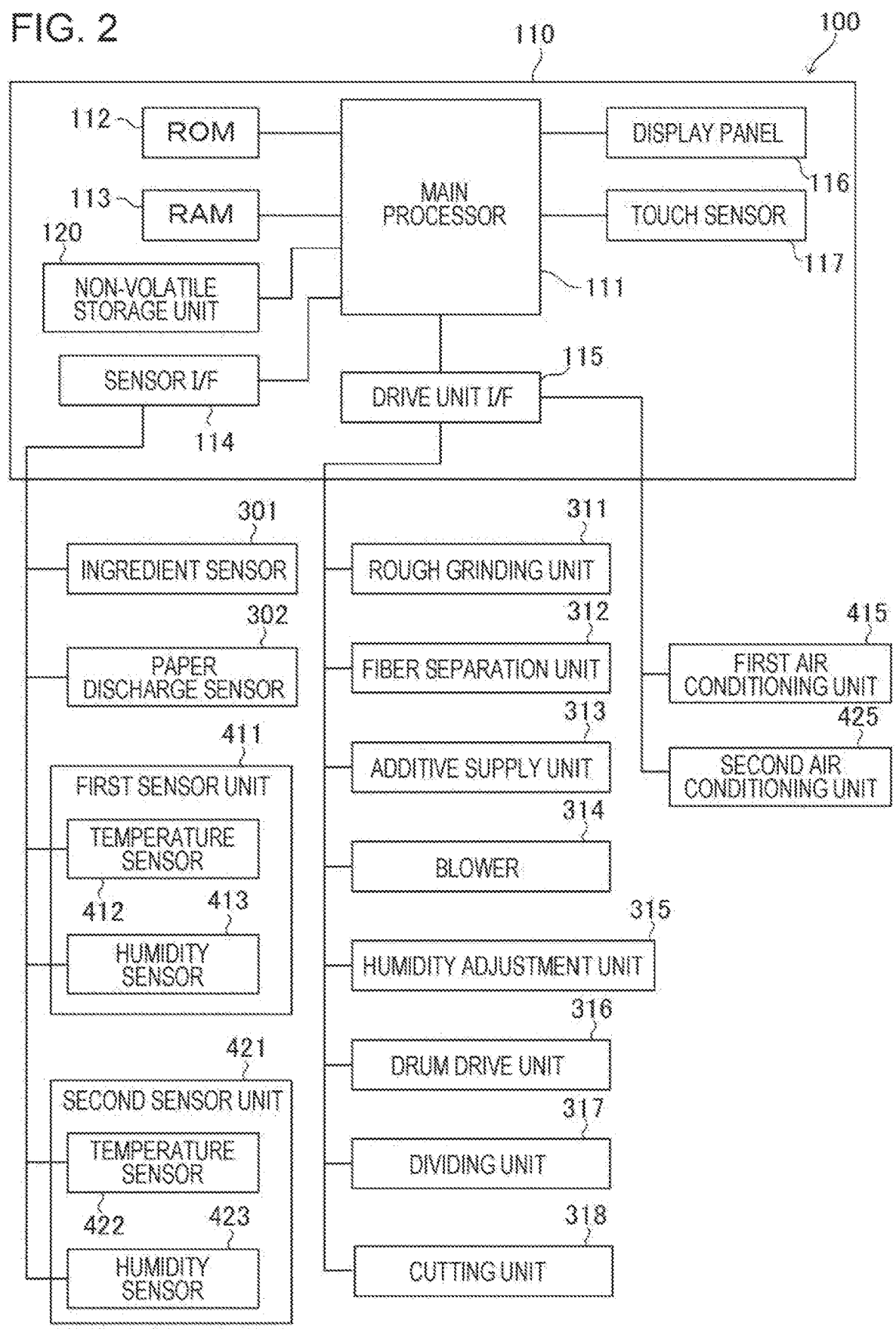
FIG. 2 is an explanatory diagram of a control system of the sheet fabrication apparatus.

FIG. 2 is a block diagram illustrating a configuration of a control system of the sheet fabrication apparatus 100.

The sheet fabrication apparatus 100 includes the control device 110 that has a main processor 111 that controls the respective parts in the sheet fabrication apparatus 100.

The control device 110 includes a main processor 111, a read only memory (ROM) 112, and a random access memory (RAM) 113. The main processor 111 is an arithmetic processing device such as a central processing unit (CPU) and controls the respective parts in the sheet fabrication apparatus 100 by executing a basic control program stored in the ROM 112. The main processor 111 may be formed as a system chip that includes peripheral circuits such as the ROM 112 and the RAM 113 and another IP core.

The ROM 112 stores, in a non-volatile manner, the program that the main processor 111 executes. The RAM 113 forms a work area that the main processor 111 uses and temporarily stores the program that the main processor 111 executes and data as a target of processing.

A non-volatile storage unit 120 stores the program that the main processor 111 executes and the data that the main processor 111 processes.

A display panel 116 is a panel for display, such as a liquid crystal display, and is mounted on an exterior of the sheet fabrication apparatus 100, for example. The display panel 116 displays an operation state of the sheet fabrication apparatus 100, various setting values, alert display, and the like in accordance with control of the main processor 111.

A touch sensor 117 detects touch (contact) operations and pressing operations. The touch sensor 117 is arranged such that the touch sensor 117 is overlaid on a display screen of the display panel 116, for example, and detects operations performed on the display panel 116. The touch sensor 117 responds to the operations and outputs operation data including operation positions and the number of operation positions to the main processor 111. The main processor 111 detects operations performed on the display panel 116 and acquires operation positions from the output of the touch sensor 117. The main processor 111 realizes graphical user interface (GUI) operations on the basis of the operation positions detected by the touch sensor 117 and display data 122 being displayed on the display panel 116.

The control device 110 is connected to the sensors mounted on the respective parts in the sheet fabrication apparatus 100 via a sensor interface (I/F) 114. The sensor I/F 114 is an interface that acquires detection values output by the sensors and inputs the detection values to the main processor 111. The sensor I/F 114 may include an analogue/digital (A/D) converter that converts analog signals output by the sensors into digital data. Also, the sensor I/F 114 may supply drive currents to the respective sensors. The sensor I/F 114 may include a circuit that acquires output values of the respective sensors in accordance with sampling frequencies designated by the main processor 111 and outputs the output values to the main processor 111.

An ingredient sensor 301 and a paper discharge sensor 302 are connected to the sensor I/F 114. Also, the first sensor unit 411 and the second sensor unit 421 are respectively connected to the sensor I/F 114.

The ingredient sensor 301 measures an amount of remaining ingredient MA that the supply unit 10 accommodates. For example, the ingredient sensor 301 is formed of an optical sensor that detects that the ingredient MA placed in the supply unit 10 has reached an upper limit. The control device 110 provides a notification to the supply unit 10 in order for the supply unit 10 not to add the ingredient MA in a case in which the amount of ingredient MA has become equal to or greater than a setting value on the basis of a measurement value of the ingredient sensor 301.

The paper discharge sensor 302 measures the amount of the sheet S accumulated on the tray or the stacker that the discharge unit 96 has. The control device 110 provides a notification in a case in which the amount of the sheet S measured by the paper discharge sensor 302 has become equal to or greater than a setting value.

The first sensor unit 411 includes the temperature sensor 412 and the humidity sensor 413. The first sensor unit 411 respectively outputs a temperature measurement value measured by the temperature sensor 412 and a humidity measurement value measured by the humidity sensor 413 to the control device 110.

The second sensor unit 421 includes the temperature sensor 422 and the humidity sensor 423. The second sensor unit 421 respectively outputs a temperature measurement value measured by the temperature sensor 422 and a humidity measurement value measured by the humidity sensor 423 to the control device 110.

Specific modes of the temperature sensors 412 and 422 can be arbitrarily selected, can be formed using a thermocouple, a resistance temperature measurer, a thermistor, or other various elements, and may be formed of a circuit including a plurality of elements. Specific modes of the humidity sensors 413 and 423 can also be arbitrarily selected, and an electric resistance-type humidity sensor, an electrostatic capacitance-type humidity sensor, or the like can be used.

Each of the first sensor unit 411 and the second sensor unit 421 may output analog signals as temperature and humidity measurement values or may output digital data indicating the measurement values. Also, each of the first sensor unit 411 and the second sensor unit 421 may output data in which the temperature measurement value and the humidity measurement value are integrated.

The first sensor unit 411 may include a plurality of temperature sensors 412 and regard a value obtained by statistically processing measurement results of these plurality of temperature sensors 412 as a measurement value. The same is true for the humidity sensor 413. Also, the second sensor unit 421 may include a plurality of temperature sensors 422 and regard a value obtained by statistically processing measurement results of these plurality of temperature sensors 422 as a measurement value. The same is true for the humidity sensor 423.

The control device 110 is connected to the respective drive units included in the sheet fabrication apparatus 100 via a drive unit interface (I/F) 115. The drive units included in the sheet fabrication apparatus 100 include a motor, a pump, a heater, and the like. The drive unit I/F 115 may be connected to a drive circuit or a drive integrated circuit (IC) that supplies a drive current to the motor under control of the control device 110 in addition to the configurations that are directly connected to the motor.

The rough grinding unit 311, the fiber separation unit 312, the additive supply unit 313, the blower 314, the humidity adjustment unit 315, the drum drive unit 316, the dividing unit 317, and the cutting unit 318 are connected, as targets of control performed by the control device 110, to the drive unit I/F 115.

The rough grinding unit 311 includes drive units such as a motor that rotates the rough grinding blade 14. The fiber separation unit 312 includes drive units such as a motor for rotating a rotor (not illustrated) that the fiber separation unit 20 includes. The additive supply unit 313 includes drive units such as a motor that drives a screw feeder that sends out an additive and a motor and an actuator that open and close the shutter.

The blower 314 includes the mixing blower 56 and the like. These respective blowers may individually be connected to the drive unit I/F 115.

The humidity adjustment unit 315 includes an ultrasonic vibration generation device (not illustrated) and a fan (not illustrated) that the humidity adjustment unit 78 includes, a pump (not illustrated), and the like.

The drum drive unit 316 includes drive units such as a motor that rotates the drum unit 41 and a motor that rotates the drum unit 61.

The dividing unit 317 includes drive units such as a motor (not illustrated) that rotates the rotating body 49.

The cutting unit 318 includes a motor (not illustrated) and the like that causes the respective blades of the first cutting unit 92 and the second cutting unit 94 of the cutting unit 90 to operate.

In addition, a motor that drives the calendar roller 85, a heater that heats the heating roller 86, and the like may be connected to the drive unit I/F 115.

The first air conditioning unit 415 and the second air conditioning unit 425 are connected to the drive unit I/F 115.

The control device 110 causes the first air conditioning unit 415 to operate and adjusts the temperature in the first space 410a. The adjustment of the temperature in the first space 410a includes cooling of the first space 410a, and in a case in which the first air conditioning unit 415 is configured to be able to heat the first space 410a, the adjustment may include control of raising the temperature in the first space 410a.

The control device 110 causes the second air conditioning unit 425 to operate and adjusts the temperature and the humidity in the second space 420a. The adjustment of the temperature in the second space 420a includes heating and cooling of the second space 420a. Also, the second air conditioning unit 425 humidifies the second space 420a under control performed by the control device 110.

Figure 3:
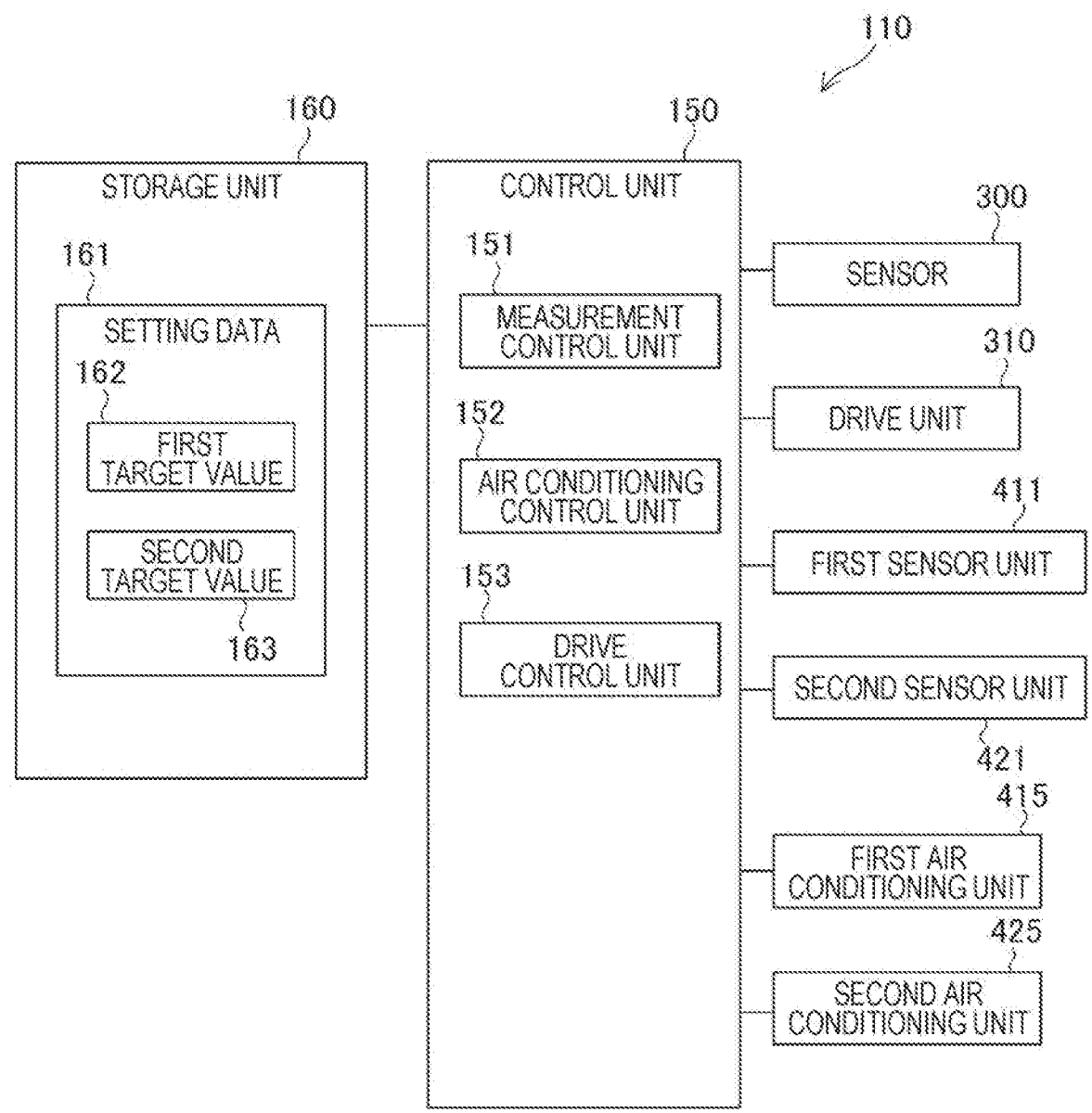
FIG. 3 is a functional block diagram of a control device.

FIG. 3 is a functional block diagram of the control device 110.

The control device 110 realizes various functional units through cooperation between software and hardware by the main processor 111 executing a program. FIG. 2 illustrates a function of the main processor 111 that has these functional units as a control unit 150. The control device 110 forms the storage unit 160, which is a theoretical storage device, using a storage region of the non-volatile storage unit 120. Here, the storage unit 160 may be formed using a storage region in the ROM 112 or the RAM 113.

The control unit 150 includes a measurement control unit 151, an air conditioning control unit 152, and a drive control unit 153. These respective parts are realized by the main processor 111 executing a program. The control device 110 may execute an operating system (OS) that forms a platform of an application program as a basic control program for controlling the sheet fabrication apparatus 100. In this case, the respective functional parts of the control unit 150 may be implemented as an application program.

FIG. 3 illustrates, as targets of control performed by the control unit 150, the first sensor unit 411, the second sensor unit 421, the first air conditioning unit 415, and the second air conditioning unit 425. FIG. 3 also illustrates, as targets of control performed by the control unit 150, a sensor 300 and a drive unit 310. The sensor 300 collectively refers to the sensors that are connected to the sensor I/F 114 in FIG. 2 and excludes the first sensor unit 411 and the second sensor unit 421. Also, the drive unit 310 collectively refers to the respective drive units that are connected to the drive unit I/F 115 excluding the first air conditioning unit 415 and the second air conditioning unit 425.

The storage unit 160 stores various kinds of data to be processed by the control unit 150. For example, the storage unit 160 stores setting data 161.

The setting data 161 is generated in response to operations performed on the touch sensor 117 or on the basis of commands or data input via a communication interface (not illustrated) that the control device 110 includes and is then stored in the storage unit 160.

The setting data 161 includes various setting values and the like related to operations of the sheet fabrication apparatus 100. For example, the setting data 161 includes setting values such as the number of sheets S fabricated by the sheet fabrication apparatus 100, the type or the color of the sheets S, and operation conditions of the respective parts in the sheet fabrication apparatus 100.

The drive control unit 153 of the control unit 150 causes the respective parts in the sheet fabrication apparatus 100 in accordance with the setting values of the setting data 161 and fabricates the sheets S by acquiring measurement results of the sensor 300 and controlling the drive unit 310.

The setting data 161 includes a first target value 162 and a second target value 163 as setting values related to control of air conditioning using the first air conditioning unit 415 and the second air conditioning unit 425. The first target value 162 is a target value of air conditioning in the first space 410a, and specifically is a target temperature. The second target value 163 is a target value of air conditioning in the second space 420a and includes a target temperature and a target humidity. Although the temperatures and the humidity included in the first target value 162 and the second target value 163 may be able to be dynamically set, the temperatures and the humidity are set in advance and are stored in the storage unit 160 in the embodiment.

The measurement control unit 151 controls measurement performed by the sensor 300, the first sensor unit 411, and the temperature sensor 412 and acquires measurement values of the respective sensors.

The air conditioning control unit 152 causes the first air conditioning unit 415 to operate on the basis of the measurement value of the first sensor unit 411 measured by the measurement control unit 151 and the first target value 162. The air conditioning control unit 152 controls the first air conditioning unit 415 such that the temperature in the first space 410a becomes the temperature of the first target value 162. Also, the air conditioning control unit 152 causes the second air conditioning unit 425 to operate on the basis of the measurement value of the second sensor unit 421 and the second target value 163. The air conditioning control unit 152 controls the second air conditioning unit 425 such that the temperature in the second space 420a becomes the target temperature included in the second target value 163. Also, the air conditioning control unit 152 controls the second air conditioning unit 425 such that the humidity in the second space 420a becomes the target humidity included in the second target value 163.

The second target value 163 is set such that the temperature and the humidity in the second space 420a form an environment in which the micronized articles or various processing target objects (for example, second separated articles of the sorting unit 40; the first web W1 and the second web W2) derived from the micronized articles tend not to be charged with static electricity. For example, the target value of the humidity in the second space 420a included in the second target value 163 is preferably set to relative humidity (RH) of 55%. The target value is more preferably set to relative humidity of 60% and is further preferably set to relative humidity of 65%.

If the target value of the humidity in the second space 420a is high, the amount of moisture absorbed by the micronized articles or the various processing target objects derived from the micronized articles increases in the second chamber 420, and the micronized article thus tends not to be dried. Further, if the micronized articles are at a low temperature, dew condensation tends to occur on the micronized articles. In a case in which air conditioning is performed such that the air temperature in the first space 410a is lower than that in the second space 420a by the first air conditioning unit 415, for example, the micronized articles transported from the first space 410a to the fabrication unit 102 tend to cause dew condensation in the second space 420a. If the target value of the humidity in the second space 420a is high, dew condensation further tends to occur.

If the amount of humidity absorbed by the micronized articles is high, it is possible to reduce influences of static electricity on the micronized articles. That is, it is possible to suppress or prevent charging of the micronized article with electricity due to friction. Therefore, it is possible to condensation of the fiber contained in the micronized articles and particles other than the fibers due to static electricity and to improve efficiency of separating the fiber from components other than the fiber. Also, it is possible to prevent or suppress adhesion of the fiber contained in the micronized articles and particles other than the fiber to the inside of the micronizing unit or the path through which the fiber and the particles are transported from the micronizing unit to the working unit. In addition, it is possible to prevent or suppress adhesion of the micronized articles due to static electricity during the process of processing the micronized articles. In this manner, it is possible to improve processing efficiency of the ingredient MA or the micronized articles by adjusting the humidity in the second space 420a.

The second target value 163 may include not only the target value of the humidity but also the target value of the temperature. In a case in which the temperature and the humidity in the second space 420a are high, and the temperature in the first space 410a is low, dew condensation further tends to occur on the micronized articles.

The target value of the temperature in the second space 420a included in the second target value 163 can be equal to or greater than 20° C. and can more preferably be 23° C. In this case, the target value of the temperature in the first space 410a included in the first target value 162 is preferably lower than the target value of the temperature in the second space 420a. Further, the target value of the temperature in the first space 410a is more preferably equal to or less than the dew point temperature for the target values of the temperature and the humidity in the second space 420a defined by the second target value 163.

For example, the dew point under conditions at the air temperature of 23 degrees and with relative humidity of 50% is 12° C. Therefore, in a case in which the target value of the temperature of the second target value 163 is 23° C. and the target value of the relative humidity is 50%, the target value of the temperature included in the first target value 162 is preferably equal to or less than 12° C.

In this manner, the first target value 162 and the second target value 163 are set to be the temperature and the humidity suitable for the processing of the micronized articles in advance.

As for the temperature and the humidity of the second target value 163, the temperature can be any of 20° C., 23° C., and 25° C. while relative humidity can be either 50% or 65% in accordance with a standard state defined by JIS 8703:1983 (corresponding to ISO 554-1976). In this case, although an allowable difference of the temperature can be ±0.5° C., ±1° C., ±2° C., ±5° C., or the like while an allowable difference of the humidity can be ±2%, ±5%, ±10%, or the like, the allowable differences can be decided depending on air conditioning ability of the second air conditioning unit 425. In addition, the temperature of the second target value 163 may be appropriately set to an ordinary temperature (within a range of 5° C. to 35° C. according to JIS 8703:1983). For example, the temperature of the second target value 163 may be 35° C. that is an upper limit of the ordinary temperature or may be 5° C. that is a lower limit of the ordinary temperature. In addition, the humidity of the second target value 163 may be appropriately set to ordinary humidity (within a range of relative humidity (RH) of 45% to 85% according to JIS 8703:1983). For example, the humidity of the second target value 163 may be 85% that is an upper limit of the ordinary humidity or may be 45% that is a lower limit of the ordinary humidity.

Here, typical examples of the temperature and the humidity of the second target value 163 and dew point temperatures corresponding to the respective examples will be described.

Example 1

In an example of a standard state, it is assumed that the temperature is 23° C. and the relative humidity is 50%. The dew point temperature is 12.0° C.

Example 2

In an example of employing center values of the ordinary temperature and the ordinary humidity, it is assumed that the temperature is 20° C. and the relative humidity is 65%. The dew point temperature is 13.2° C.

Example 3

In an example of employing lower limits of the ordinary temperature and the ordinary humidity, it is assumed that the temperature is 5° C. and the relative humidity is 45%. The dew point temperature is −6° C.

Example 4

In the example of employing upper limits of the ordinary temperature and the ordinary humidity, it is assumed that the temperature is 35° C. and the relative humidity is 85%. The dew point temperature is 32.1° C.

Example 5

In an example within ranges of the ordinary temperature and the ordinary humidity, the ranges of the temperature and the humidity of the second target value 163 are defined. That is, it is assumed that the temperature is 20±15° C. and the relative humidity is 65±20%. The dew point temperature is −6° C. to 32.1° C.

The second target value 163 can be appropriately set as described above. The first target value 162 is set to be equal to or less than the dew point temperature that is required from the temperature and the humidity of the second target value 163.

1-3. Operations of Sheet Fabrication Apparatus

Figure 4:
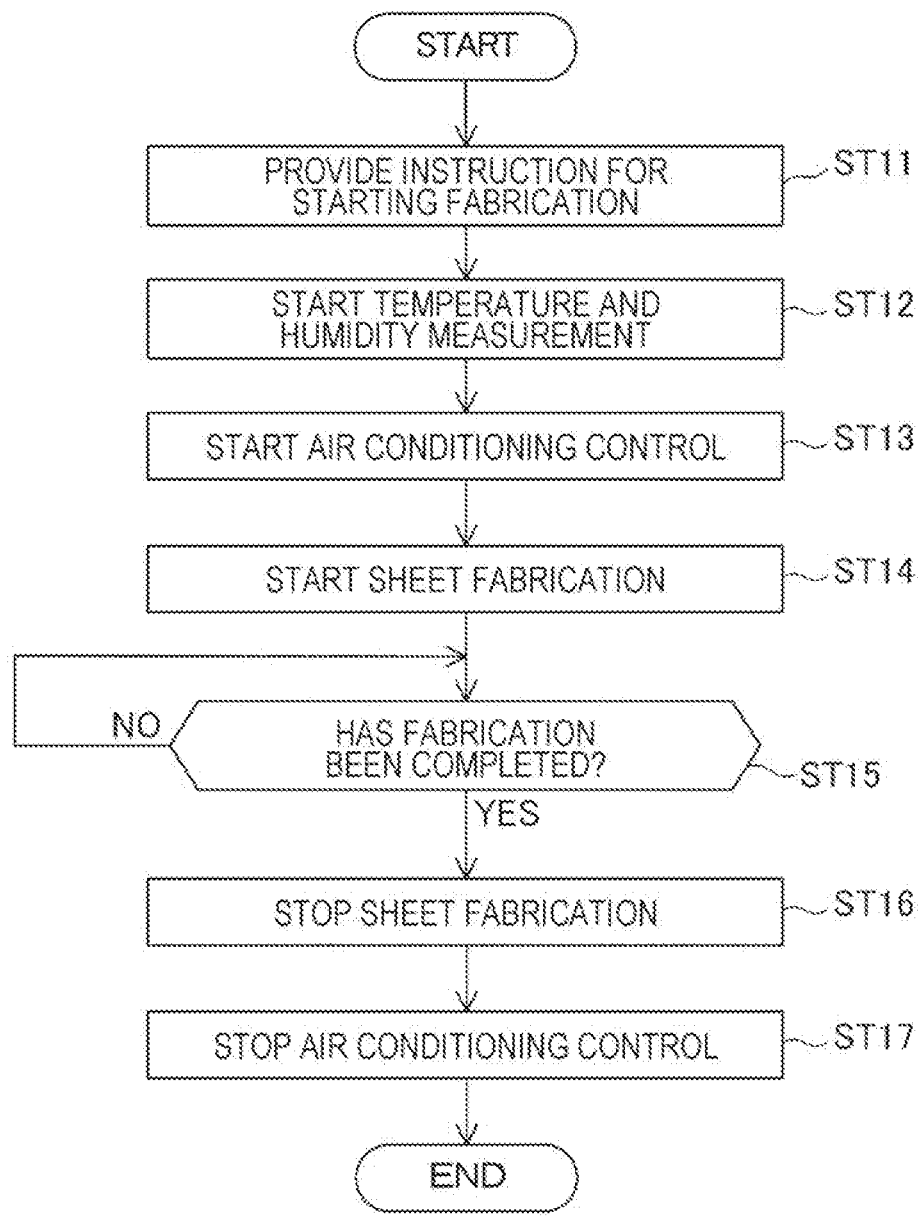
FIG. 4 is a flowchart illustrating operations of the sheet fabrication apparatus.

FIG. 4 is a flowchart illustrating operations of the sheet fabrication apparatus 100.

If an instruction for fabricating the sheet S is provided through an operation or the like performed on the touch sensor 117 (Step ST11), the control unit 150 starts to fabricate the sheet S in accordance with the setting data 161. First, the control unit 150 starts to measure the temperature and the humidity using the first sensor unit 411 and the second sensor unit 421 (Step ST12). After Step ST12, the control unit 150 executes an operation of acquiring measurement values of the first sensor unit 411 and the second sensor unit 421 in accordance with a preset sampling cycle, and the operation corresponds to the measurement process. In detail, the operation of the control unit 150 measuring the temperature in the first space 410*a* using the first sensor unit 411 corresponds to the first measurement process, and the operation of measuring the temperature and/or the humidity in the second space 420*a* using the second sensor unit 421 corresponds to the second measurement process.

The control unit 150 starts to control the first air conditioning unit 415 and the second air conditioning unit 425 (Step ST13). The control unit 150 controls the first air conditioning unit 415 and the second air conditioning unit 425 on the basis of the measurement value of the first sensor unit 411, the measurement value of the temperature sensor 412, the first target value 162, and the second target value 163. In this manner, the first space 410*a* and the second space 420*a* are adjusted to have the temperatures and the humidity respectively defined by the first target value 162 and the second target value 163. The operation of the control unit 150 performing air conditioning using the first air conditioning unit 415 and the second air conditioning unit 425 corresponds to the temperature adjustment process. The temperature adjustment process includes at least the operation of the control unit 150 controlling the first air conditioning unit 415 on the basis of the measurement value of the first sensor unit 411 and/or the measurement value of the second sensor unit 421. In addition, the temperature adjustment process may include control of the control unit 150 adjusting the temperature and/or the humidity using the second air conditioning unit 425.

Thereafter, the control unit 150 starts to fabricate the sheet S (Step ST14). That is, the control unit 150 starts to execute the supply process in which the supply unit 10 supplies the ingredient MA, the micronizing process that is performed by the rough grinding unit 12 and the fiber separation unit 20, and the working process that is then performed by the fabrication unit 102. The working process includes the classification process that is performed by the sorting unit 40, the first web formation process that is performed by the first web formation unit 45, the dividing process that is performed by the rotating body 49, and the mixing process that is performed by the mixing unit 50. Also, the working process includes the depositing process that is performed by the piling unit 60, the second web formation process that is performed by the second web formation unit 70, the transport process that is performed by the transport unit 79, the heating process and the pressurizing process that are performed by the sheet formation unit 80, and the cutting process that is performed by the cutting unit 90.

The control unit 150 counts the number of fabricated sheets S and determines whether or not the fabrication of the number, which is designated by the setting data 161, of the sheets S has been completed (Step ST15). In a case in which the fabrication of the sheets S has not been completed (Step ST15: NO), the control unit 150 continues to fabricate and count the sheets S. In a case in which the fabrication of the sheets S has been completed (Step ST15: YES), the control unit 150 stops to fabricate the sheets S (Step ST16), stops control of the first air conditioning unit 415 and the second air conditioning unit 425 (Step ST17), and ends the processing.

As described above, the sheet fabrication apparatus 100 according to the first embodiment to which the invention is applied includes the rough grinding unit 12 and/or the fiber separation unit 20 as the micronizing unit that micronizes the ingredient MA. The sheet fabrication apparatus 100 includes the first sensor unit 411 that measures the temperature in the first space 410*a* including the micronizing unit and the first air conditioning unit 415 that adjusts the temperature in the first space 410*a*. Also, the sheet fabrication apparatus 100 includes the fabrication unit 102 that processes the micronized articles (the roughly ground pieces MB or the fiber separate articles MC) obtained by the micronizing unit micronizing the ingredient MA outside the first space 410*a*. In addition, the sheet fabrication apparatus 100 includes the second sensor unit 421 that measures at least either the temperature or the humidity at the mounting position of the fabrication unit 102. The sheet fabrication apparatus 100 includes the control unit 150 that controls the first air conditioning unit 415 on the basis of at least any of measurement results of the first sensor unit 411 and the second sensor unit 421.

According to the sheet fabrication apparatus 100, it is possible to set the temperature during the processing of micronizing, grinding, or performing fiber separation on the ingredient MA to a temperature that is suitable for working the micronized articles or transporting the micronized articles to the fabrication unit 102. It is possible to set the temperature of the ingredient MA during the processing of micronizing the ingredient MA using the rough grinding unit 12 or the fiber separation unit 20 and the temperature of the micronized articles that are transported to the fabrication unit 102 to be low by setting the temperature in the first space 410*a* to be a low temperature, for example. In this case, it is possible to enhance brittleness of the ingredient MA and to efficiently separate colored components from the fiber contained in the ingredient MA using the rough grinding unit or the fiber separation unit 20. When the micronized articles are transported from the first space 410*a* to the fabrication unit 102 that is located outside the first space 410*a*, dew condensation tends to occur on the micronized articles. Therefore, humidity is applied to the micronized articles, and it is possible to prevent or reduce influences of static electricity. As a result, it is possible to prevent condensation of the fiber contained in the micronized articles and the particles other than the fiber due to static electricity and to improve efficiency of separating the fiber from the components other than the fiber. In addition, it is possible to prevent or suppress adhesion of the fiber contained in the micronized articles and the particles other than the fiber to the inside of the micronizing unit or the path through which the fiber or the particles are transported from the micronizing unit to the working unit. Also, it is possible to prevent or suppress adhesion of the micronized articles due to static electricity during the process of processing the micronized articles. Therefore, it is possible to improve processing efficiency of the ingredient MA or the micronized articles by adjusting the temperature in the first space 410a.

The sheet fabrication apparatus 100 includes the second air conditioning unit 425 that adjusts the temperature and the humidity in the second space 420a that is a space in which the fabrication unit 102 is mounted. The second sensor unit 421 measures at least either the temperature or the humidity in the second space 420a. The control unit 150 controls the second air conditioning unit 425 on the basis of the target values (second target value 163) set in advance for the temperature and the humidity in the second space 420a and the measurement result of the second sensor unit 421. Therefore, it is possible to match the temperature and the humidity in the second space 420a in which the fabrication unit 102 is mounted to the target values. In this manner, it is possible to prevent condensation of the fiber contained in the micronized articles and the particles other than the fiber due to static electricity by adjusting the temperature and the humidity in the second space 420a to a temperature and humidity at which dew condensation tends to occur on the micronized articles transported from the first space 410a, for example. In addition, it is possible to prevent or suppress adhesion of the fiber contained in the micronized articles and the particles other than the fiber to the inside of the micronizing unit and the path through which the fiber and the particles are transported from the micronizing unit to the working unit. Also, it is possible to prevent or suppress adhesion of the micronized articles due to static electricity during the process of processing the micronized articles. Therefore, it is possible to improve processing efficiency of the micronized articles by adjusting the temperature and the humidity in the second space 420a.

The micronizing unit includes at least either the rough grinding unit 12 that serves as a shredding device that shreds the ingredient MA in the sheet form or the fiber separation unit 20 that serves as a fiber separation machine that performs fiber separation on the ingredient MA to transform it into a fiber form. In this manner, it is possible to improve processing efficiency of the rough grinding unit 12 and the fiber separation unit 20 and to improve efficiency of transporting the shredded pieces shredded by the shredding device or the fiber separated articles obtained by the fiber separation machine performing the fiber separation.

The sheet fabrication apparatus 100 has the first chamber 410 that accommodates the micronizing unit. The first sensor unit 411 measures the temperature in the first space 410a that is an inner space of the first chamber 410. With the configuration in which the micronizing unit including the rough grinding unit 12 and/or the fiber separation unit 20 is accommodated in the first chamber 410, it is possible to reliably measure the temperature and the humidity in the space in which the micronizing unit is located and to reliably adjust the temperature using the first air conditioning unit 415.

The sheet fabrication apparatus 100 has the second chamber 420 that accommodates the fabrication unit 102. The second sensor unit 421 measures at least either the temperature or the humidity in the inner space of the second chamber 420. With the configuration in which the fabrication unit 102 is accommodated in the second chamber 420, it is possible to reliably measure the temperature and the humidity at the location of the fabrication unit 102.

In addition, the fabrication unit 102 has a sorting unit 40 that serves as a classification unit that classifies the micronized articles, and the sorting unit 40 is accommodated in the second chamber 420. In this manner, it is possible to reliably measure the temperature and the humidity at the position at which the micronized articles are classified.

In addition, the fiber ingredient reproduction method using the sheet fabrication apparatus 100 has the micronizing process of micronizing the ingredient MA using the micronizing unit, the first measurement process of measuring the temperature in the first space 410a in which the micronizing process is executed, and the working process of working the micronized articles obtained by micronizing the ingredient MA in the micronizing process. The working process may be a process that is performed outside the first space 410a, for example. In addition, the method has the second measurement process of measuring at least either the temperature or the humidity at the position at which the working process is executed and the temperature adjustment process of adjusting the temperature in the first space 410a on the basis of any of the measurement results in the first measurement process and the second measurement process. Therefore, it is possible to set the temperature during the processing of micronizing the ingredient MA to a temperature that is suitable for working the micronized articles and transporting the micronized articles to the fabrication unit 102. For example, the temperature in the first space 410a is set to be a low temperature through the temperature adjustment process. In this case, it is possible to enhance brittleness of the ingredient MA by setting the temperature of the ingredient MA in the micronizing process and the temperature of the micronized articles transported to the working process to be low, and it is possible to efficiently separate colored components from the fiber contained in the ingredient MA. Also, dew condensation tends to occur on the micronized articles in the working process. Therefore, it is possible to reduce influences of static electricity, to prevent condensation of the fiber contained in the micronized articles and the particles other than the fiber due to static electricity, and to improve efficiency of separating the fiber from the components other than the fiber. In addition, it is possible to prevent or suppress adhesion of the fiber contained in the micronized articles and the particles other than the fiber to the inside of the micronizing unit and the path through which the fiber and the particles are transported from the micronizing unit to the working unit. In addition, it is possible to prevent or suppress adhesion of the micronized articles due to static electricity during the processing of processing the micronized articles. Therefore, it is possible to improve processing efficiency of the ingredient MA or the micronized articles by adjusting the temperature through the temperature adjustment process.

2. Second Embodiment

Next, a second embodiment to which the invention is applied will be described.

In the second embodiment, the control unit 150 of the sheet fabrication apparatus 100 controls the first air conditioning unit 415 in a mode that is different from that in the first embodiment. Since the configuration of the sheet fabrication apparatus 100 is common to that in the aforementioned first embodiment, illustration and description thereof will be omitted by using the same reference numerals.

Figure 5:
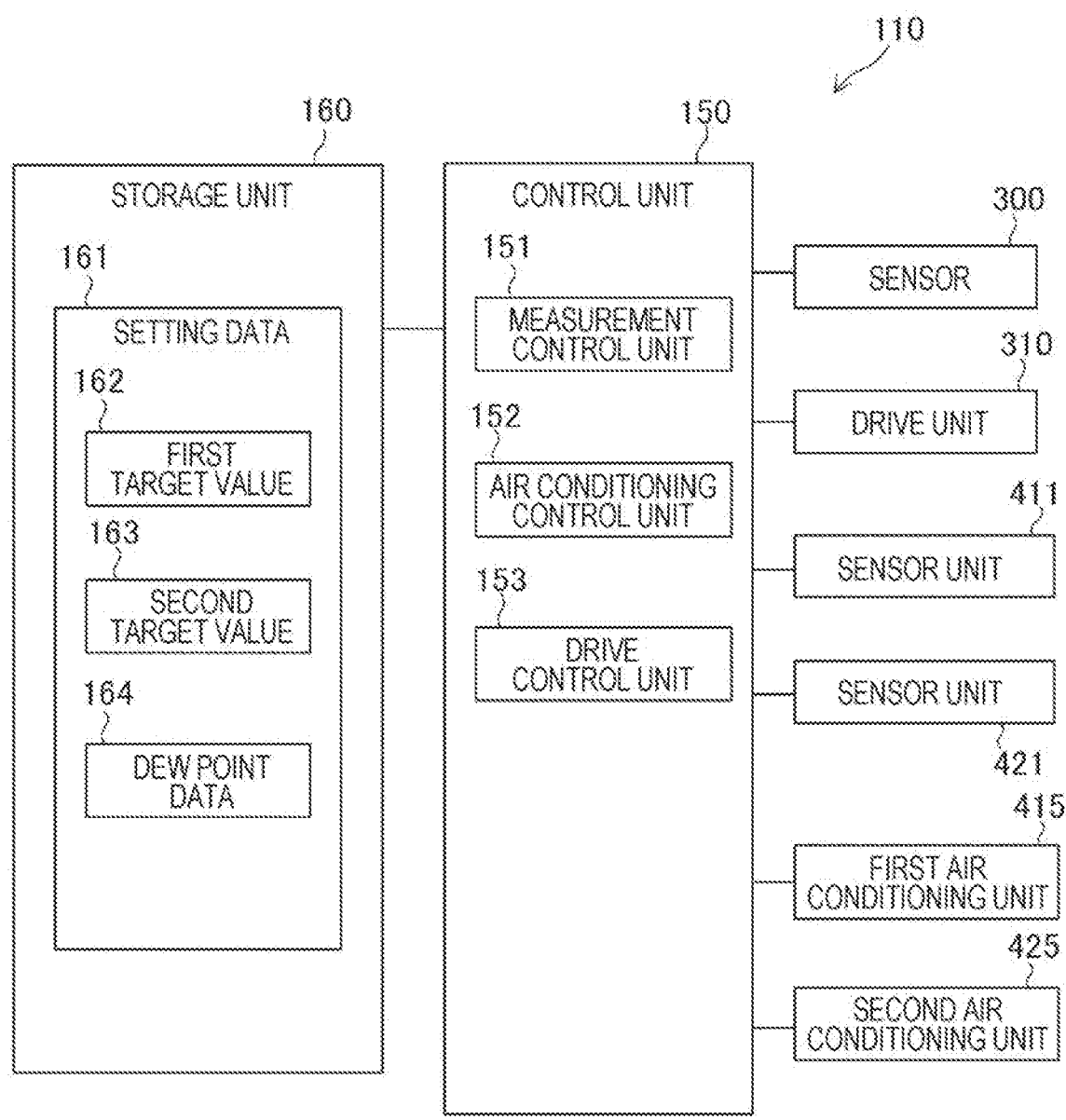
FIG. 5 is a functional block diagram of a control device that a sheet fabrication apparatus according to a second embodiment has.

FIG. 5 is a functional block diagram of the control device 110 according to the second embodiment.

In the second embodiment, dew point data 164 is included in the setting data 161 stored in the storage unit 160. The dew point data 164 includes data for calculating a temperature condition under which dew condensation occurs, that is, a "dew point" corresponding to the temperature and the humidity. The dew point data 164 includes information for the control unit 150 deciding the temperature and the humidity of the second target value 163.

In the second embodiment, the control unit 150 sets the second target value 163 on the basis of measurement values of the second sensor unit 421. The control unit 150 sets the temperature and the humidity that are close to the measurement values of the second sensor unit 421 and are suitable for the processing of the micronized article as the second target value 163. For example, the dew point data 164 includes a plurality of combinations of temperatures and humidity, and the control unit 150 selects a combination of a temperature and humidity that are close to the measurement values of the second sensor unit 421 from the dew point data 164 and sets the selected temperature and humidity as the second target value 163. For example, the dew point data 164 includes information indicating ranges of the temperature and the humidity, and the control unit 150 decides a temperature and humidity that are close to the measurement values of the second sensor unit 421 within the ranges of the dew point data 164 and sets the temperature and the humidity as the second target value 163. In this manner, it is possible to reduce a load on the second air conditioning unit 425 and to save energy consumption required for the air conditioning by the control unit 150 deciding the second target value 163 in accordance with a current state in the second space 420a.

The combination of the temperature and the humidity included in the dew point data 164 may be set in advance on the basis of the standard temperature defined by JIS 8703: 1983, the ordinary temperature, the ordinary humidity, and the like as described above in the first embodiment, for example. That is, a combination of a temperature and humidity in a standard state and within ranges of the ordinary temperature and the temperature humidity (the center values, the upper values, the lower values, and the like) may be employed.

Further, the control unit 150 sets the first target value 162 corresponding to the temperature and the humidity of the second target value 163 on the basis of the dew point data 164. That is, the control unit 150 obtains the dew point temperature at the temperature and the humidity set as the second target value 163 on the basis of the dew point data 164 and sets a temperature that is equal to or less than the obtained dew point temperature as the first target value 162. The first target value 162 may be a temperature that is equal to the dew point temperature or may be a temperature that is lower than the dew point temperature by a predetermined width.

Figure 6:
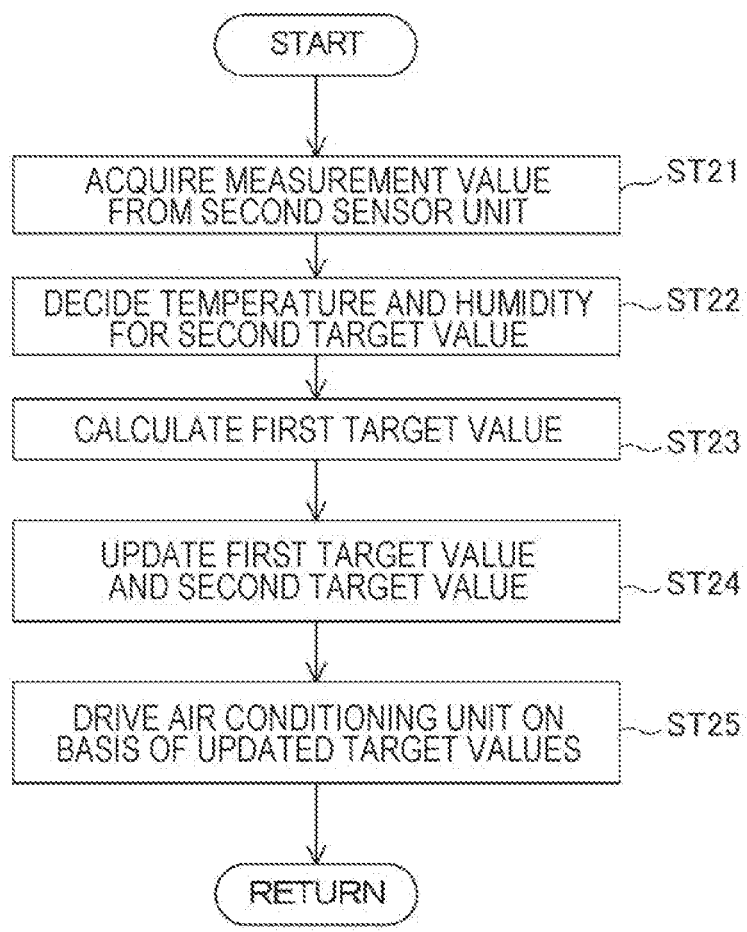
FIG. 6 is a flowchart illustrating operations of the sheet fabrication apparatus according to the second embodiment.

FIG. 6 is a flowchart illustrating operations of the sheet fabrication apparatus 100 according to the second embodiment and illustrates operations of the control unit 150 controlling the first air conditioning unit 415 and the second air conditioning unit 425. In the second embodiment, the sheet fabrication apparatus 100 executes the operations illustrated in FIG. 4 in the first embodiment and performs the operations in FIG. 6 for controlling air conditioning that is started in Step ST13 in FIG. 4.

The control unit 150 starts control of air conditioning in Step ST13 (FIG. 4), acquires measurement values of the second sensor unit 421 (Step ST21), and decides the temperature and the humidity of the second target value 163 on the basis of the acquired measurement values and the dew point data 164 (Step ST22).

The control unit 150 calculates the first target value 162 on the basis of the temperature and the humidity set in Step ST22 and the dew point data 164 (Step ST23).

The control unit 150 updates the first target value 162 and the second target value 163 on the basis of the temperature and the humidity decided in Step ST22 and the temperature calculated in Step ST23 (Step ST24) and controls the first air conditioning unit 415 and the second air conditioning unit 425 in accordance with the first target value 162 and the second target value 163 after the updating (Step ST25). That is, the first air conditioning unit 415 is caused to operate such that the temperature in the first space 410a becomes the first target value 162 on the basis of the measurement values of the first sensor unit 411. Also, the second air conditioning unit 425 is caused to operate such that the temperature in the second space 420a becomes the second target value 163 on the basis of the measurement values of the second sensor unit 421.

The control unit 150 repeatedly executes the operations in Steps ST21 to ST25 at a predetermined cycle in Steps ST14 to ST15.

According to the sheet fabrication apparatus 100 in the second embodiment, it is possible to efficiently perform the processing of micronizing the ingredient MA and the processing of the micronized articles obtained by micronizing the ingredient MA similarly to the advantages described above in the first embodiment.

The control unit 150 causes the first air conditioning unit 415 to operate on the basis of the measurement results of the second sensor unit 421. In this manner, it is possible to adjust the temperature at which the ingredient MA is micronized in accordance with the temperature and/or the humidity at the mounting position of the fabrication unit 102. Therefore, it is possible to improve processing efficiency of the ingredient MA or the micronized articles.

The second sensor unit 421 can measure the temperature and the humidity in the second space 420a at the mounting position of the fabrication unit 102, and the control unit 150 sets the first target value 162 that is the target temperature in the first space 410a on the basis of the temperature and the humidity measured by the second sensor unit 421. The control unit 150 causes the first air conditioning unit 415 to operate in accordance with the set first target value 162. In this manner, it is possible to adjust the temperature at which the ingredient MA is micronized in accordance with both the temperature and the humidity at the mounting position of the fabrication unit 102. Therefore, it is possible to further improve processing efficiency of the ingredient MA or the micronized articles.

The control unit 150 obtains the dew point temperature in the second space 420a on the basis of the measurement results of the second sensor unit 421 and sets the first target value 162 to a temperature that is equal to or less than the dew point temperature. In this manner, since the temperature of the micronized articles transported from the micronizing unit to the fabrication unit 102 is the temperature that is equal to or less than the dew point temperature at the mounting position of the fabrication unit 102, dew condensation occurs at the fabrication unit 102. Therefore, it is possible to reduce influences of static electricity in relation to the transport and the processing of the micronized articles and to improve processing efficiency of the micronized articles.

3. Third Embodiment

Figure 7:
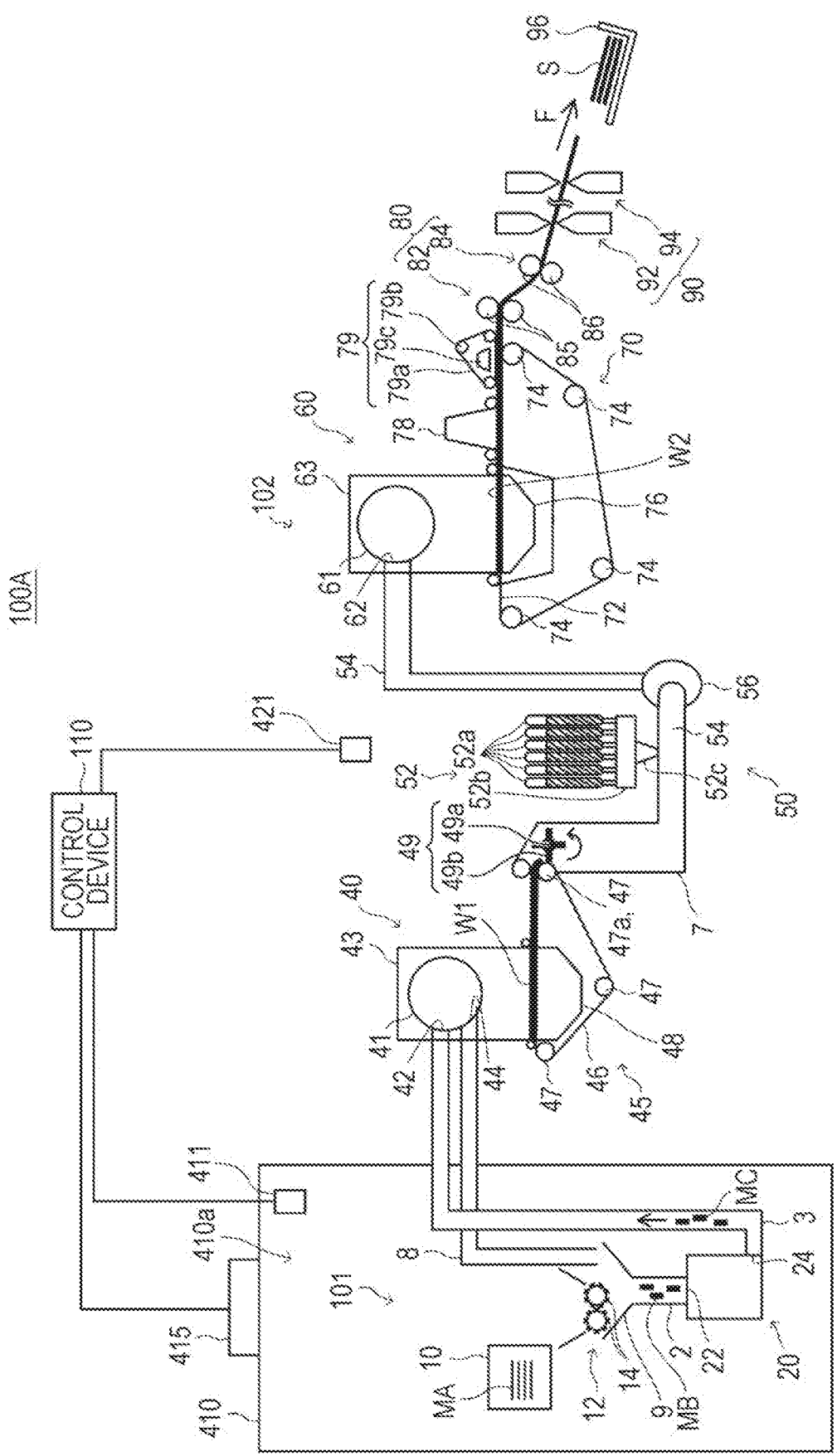
FIG. 7 is a schematic view illustrating a configuration of a sheet fabrication apparatus according to a third embodiment.

FIG. 7 is a schematic diagram illustrating a configuration of a sheet fabrication apparatus 100A according to a third embodiment to which the invention is applied.

The sheet fabrication apparatus 100A is a configuration obtained by excluding the second chamber 420 and the second air conditioning unit 425 from the sheet fabrication apparatus 100 (FIG. 1). Since the other configuration parts are common to those in the sheet fabrication apparatus 100, the same reference numerals are applied to these common configuration parts, and description thereof will be omitted.

The control device 110 of the sheet fabrication apparatus 100A does not execute control on the second air conditioning unit 425. Therefore, a control system in the sheet fabrication apparatus 100A is equivalent to a configuration obtained by excluding the second air conditioning unit 425 from the configuration illustrated in FIGS. 2 and 3, for example.

The second sensor unit 421 is mounted such that the second sensor unit 421 can measure the temperature and the humidity while targeting a mounting environment of any of configuration parts included in the fabrication unit 102. Similarly to the first and second embodiments, the second sensor unit 421 measures the temperature using the temperature sensor 422 and measures the humidity using the humidity sensor 423, and the control device 110 can acquire these measurement values.

The mounting position of the second sensor unit 421 can be a position at which the second sensor unit 421 can measure the temperature and the humidity at the mounting position of the sorting unit 40 included in the fabrication unit 102 that serves as the working unit, for example, and may be inside the drum unit 41 or in the vicinity of the drum unit 41. The second sensor unit 421 may be mounted between the sorting unit 40 and the first web formation unit 45 or at or in the vicinity of the first web formation unit 45. Alternatively, a plurality of temperature sensors 422 and humidity sensors 423 may be arranged in a dispersed manner in the vicinity of or inside a plurality of configuration parts in the fabrication unit 102.

Figure 8:
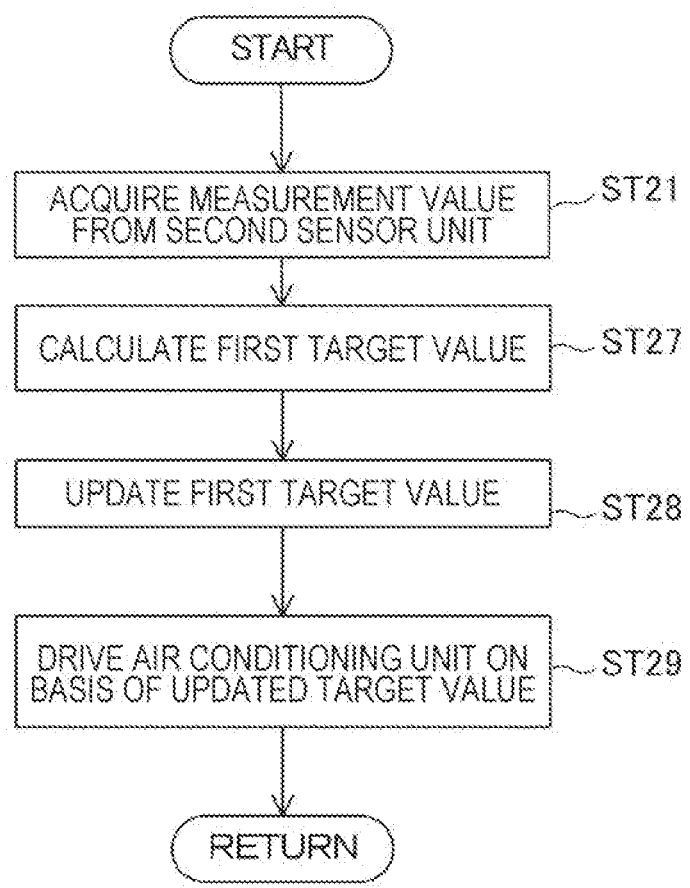
FIG. 8 is a flowchart illustrating operations of the sheet fabrication apparatus according to the third embodiment.

FIG. 8 is a flowchart illustrating operations of the sheet fabrication apparatus 100A and illustrates operations of the control unit 150 corresponding to the control illustrated in FIG. 6. That is, the sheet fabrication apparatus 100A executes the operations illustrated in FIG. 4 in the first embodiment and performs operations in FIG. 8 for controlling air conditioning that is started in Step ST13 in FIG. 4.

The control unit 150 starts to control air conditioning in Step ST13 (FIG. 4) and acquires measurement values of the second sensor unit 421 (Step ST21).

Here, since the control unit 150 does not perform the control of the second air conditioning unit 425, the control unit 150 calculates the first target value 162 on the basis of the measurement values of the second sensor unit 421 acquired in Step ST21 and the dew point data 164 without executing the operation in Step ST22 (FIG. 6) (Step ST27).

In Step ST27, the control unit 150 calculates a dew point temperature corresponding to the temperature and the humidity measured by the second sensor unit 421 and sets the calculated dew point temperature or the temperature that is lower than the dew point temperature by a predetermined value as the first target value 162.

With this configuration, the dew point data 164 includes arithmetic equations, coefficients, constants and the like for calculating the dew point temperature from the temperature and the humidity measured by the second sensor unit 421, for example. In addition, the dew point data 164 may be a lookup table (LUT) with which it is possible to obtain the dew point temperature from the temperature and the humidity.

The control unit 150 updates the first target value 162 on the basis of the temperature calculated in Step ST27 (Step ST28) and controls the first air conditioning unit 415 in accordance with the first target value 162 after the update and the second target value 163 (Step ST29). That is, the control unit 150 causes the first air conditioning unit 415 to operate such that the temperature in the first space 410a becomes the first target value 162 on the basis of the measurement values of the first sensor unit 411.

The control unit 150 repeatedly executes the operations in Steps ST21 and ST27 to ST29 at a predetermined cycle in Steps ST14 to ST15.

According to the sheet fabrication apparatus 100A in the third embodiment, effects that are similar to those in the first and second embodiments can be obtained. That is, the sheet fabrication apparatus 100A can improve processing efficiency of the micronizing process and to improve processing efficiency of the fabrication unit 102 by adjusting the temperature in the first chamber 410 that accommodates the micronizing unit that micronizes the ingredient MA on the basis of the measurement values of the second sensor unit 421.

4. Fourth Embodiment

Figure 9:
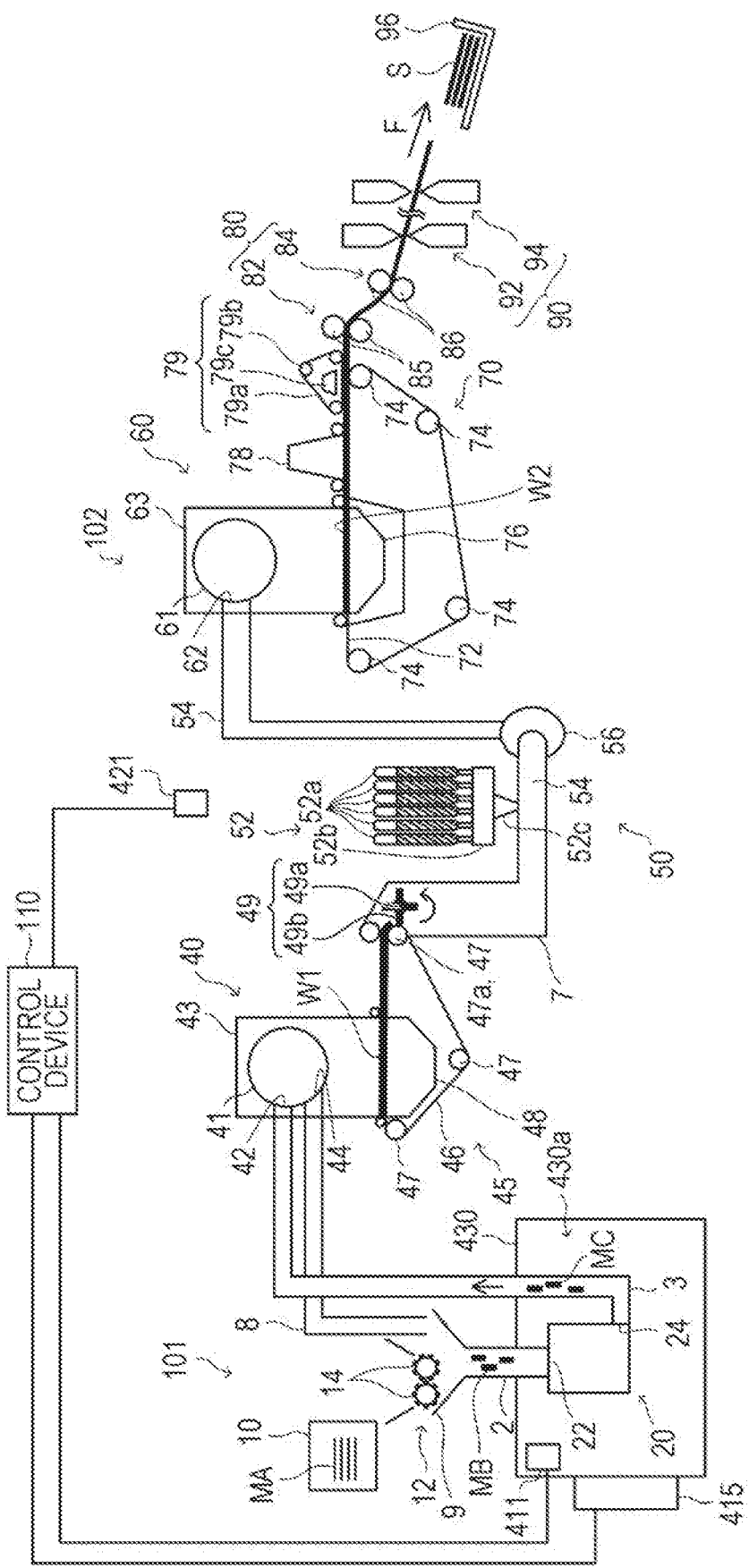
FIG. 9 is a diagram illustrating an outline configuration of a sheet fabrication apparatus according to a fourth embodiment.

FIG. 9 is a diagram illustrating an outline configuration of a sheet fabrication apparatus 100B according to a fourth embodiment.

The sheet fabrication apparatus 100B illustrated in FIG. 9 has a configuration in which a first chamber 430 (first case body) is provided instead of the first chamber 410 in the sheet fabrication apparatus 100A (FIG. 7). The first chamber 430 is a hollow case body that accommodates the fiber separation unit 20 and a part of pipe paths (pipes 2 and 3) connected to the fiber separation unit 20 and the fiber separation unit 20, and the shape and the size thereof can arbitrarily be configured similarly to the first chamber 410.

The first sensor unit 411 that measures a temperature in a first space 430a inside the first chamber 430 and the first air conditioning unit 415 that adjusts the temperature in the first space 430a are mounted in the first chamber 430. Configurations of the first sensor unit 411 and the first air conditioning unit 415 are similar to those in the first embodiment. In the fourth embodiment, the fiber separation unit 20 corresponds to the micronizing unit.

In the sheet fabrication apparatus 100B, the control device 110 can perform control similarly to the sheet fabrication apparatus 100A and can adjust the temperature during the processing of performing fiber separation on the roughly ground pieces MB using the fiber separation unit 20 and the temperature of the fiber separated articles MC obtained through the fiber separation by the fiber separation unit 20. Therefore, it is possible to improve processing efficiency of the processing of micronizing the ingredient MA and the processing of the micronized articles similarly to the sheet fabrication apparatuses 100 and 100A.

5. Fifth Embodiment

Figure 10:
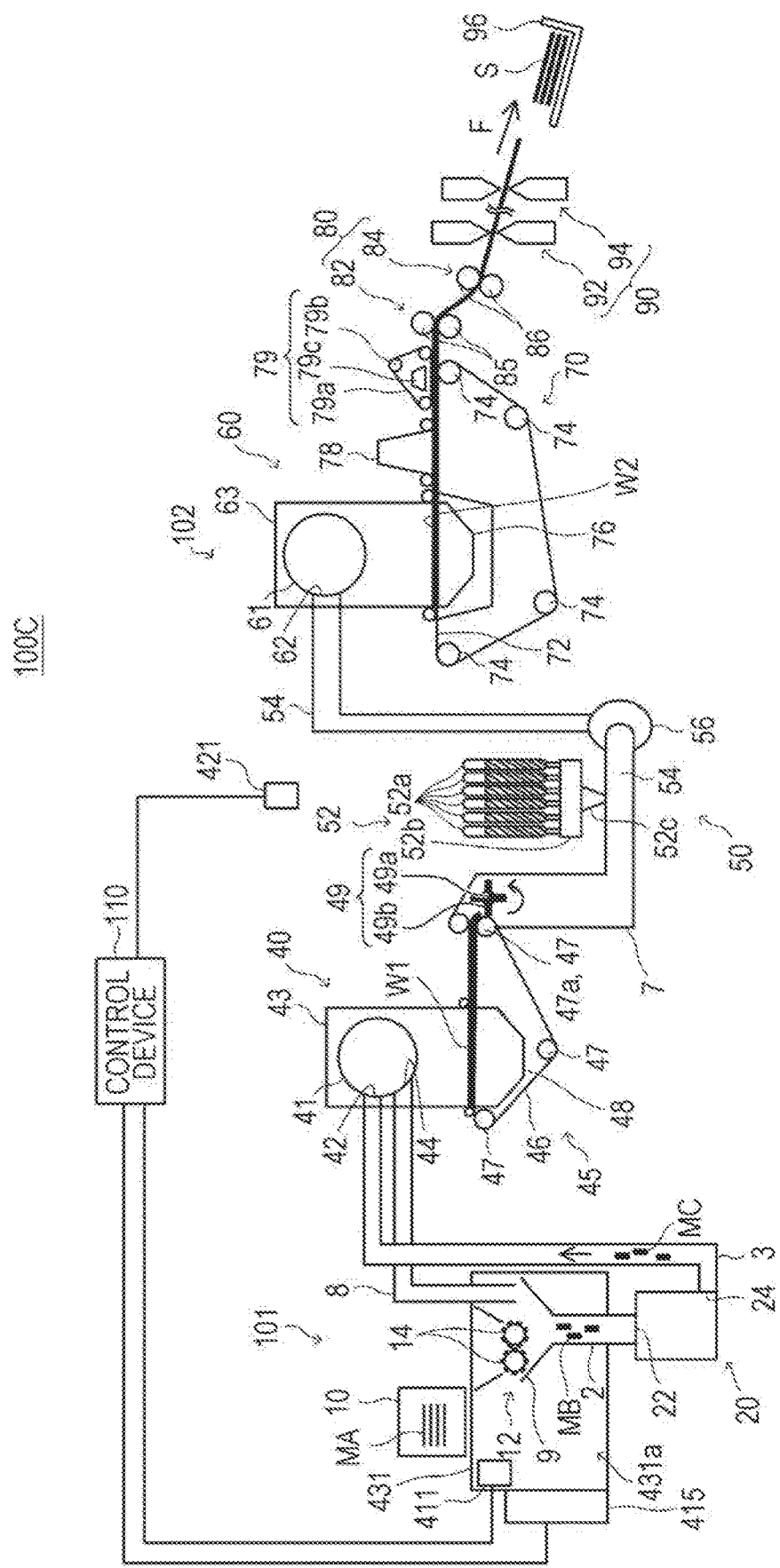
FIG. 10 is a diagram illustrating an outline configuration of a sheet fabrication apparatus according to a fifth embodiment.

FIG. 10 is a diagram illustrating an outline configuration of a sheet fabrication apparatus 100C according to a fifth embodiment.

The sheet fabrication apparatus 100C illustrated in FIG. 10 has a configuration in which a first chamber 431 (first case body) is provided instead of the first chamber 410 in the sheet fabrication apparatus 100A (FIG. 7). The first chamber 431 is a hollow case body that accommodates the rough grinding unit 12 and a part of pipe paths (pipe 2) that is connected to the rough grinding unit 12, and the shape and the size thereof can arbitrarily be configured similarly to the first chamber 410.

The first sensor unit 411 that measures a temperature in a first space 431a inside the first chamber 431 and the first air conditioning unit 415 that adjusts the temperature in the first space 431a are arranged in the first chamber 431. Configurations of the first sensor unit 411 and the first air conditioning unit 415 are similar to those in the first embodiment. In the fourth embodiment, the rough grinding unit 12 corresponds to the micronizing unit.

In the sheet fabrication apparatus 100C, the control device 110 can perform control similarly to the sheet fabrication apparatus 100A and can adjust the temperature during the processing grinding the ingredient MA using the rough grinding unit 12 and the temperature of the roughly ground pieces MB that are ground by the rough grinding unit 12. Therefore, it is possible to improve processing efficiency of the processing of micronizing the ingredient MA and the processing of the micronized articles similarly to the sheet fabrication apparatuses 100 and 100A.

6. Sixth Embodiment

Figure 11:
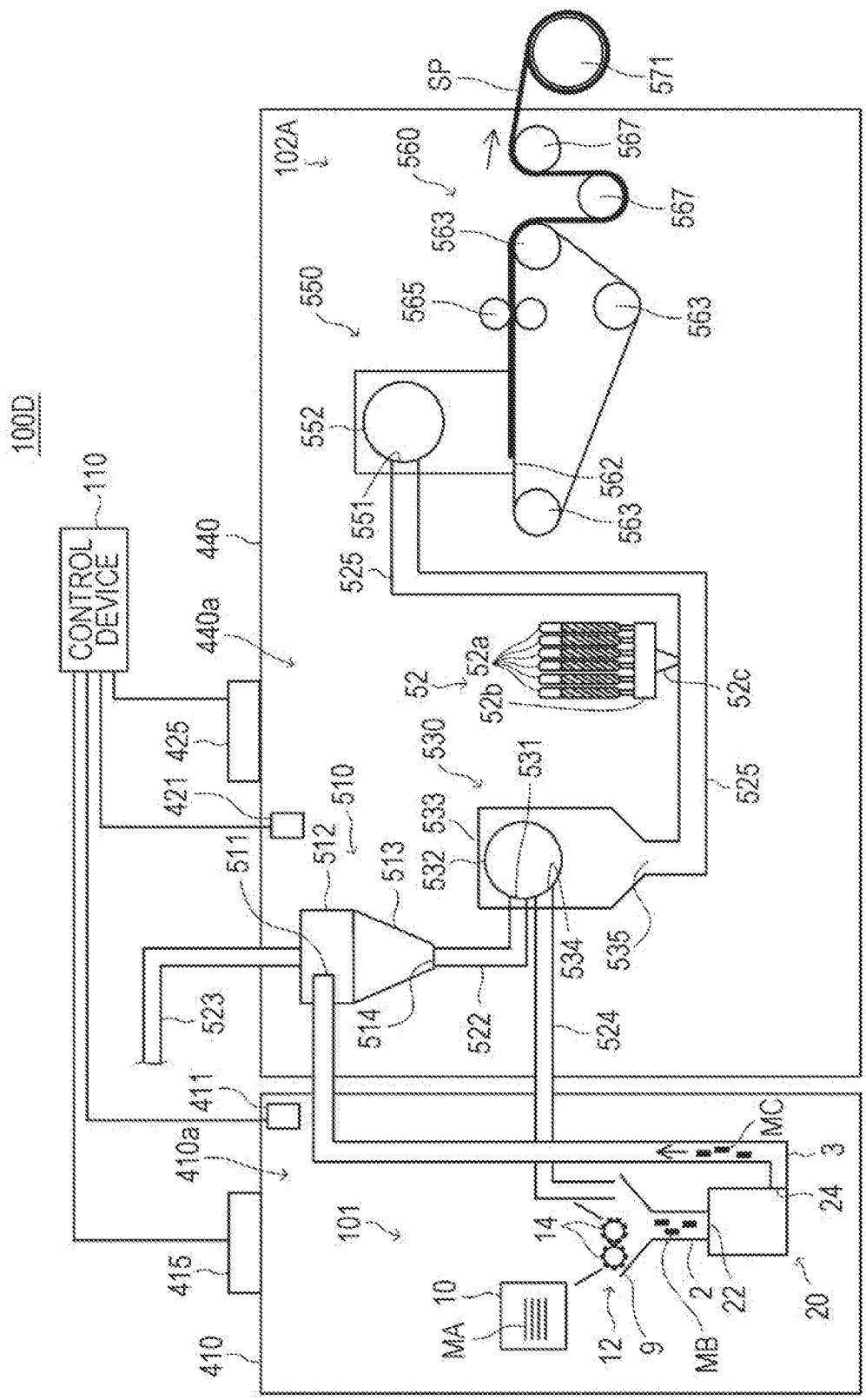
FIG. 11 is a diagram illustrating an outline configuration of a sheet fabrication apparatus according to a sixth embodiment.

FIG. 11 is a diagram illustrating an outline configuration of a sheet fabrication apparatus 100D according to a sixth embodiment.

The sheet fabrication apparatus 100D illustrated in FIG. 11 fabricates a sheet from the ingredient MA similarly to the sheet fabrication apparatus 100 (FIG. 1).

The sheet fabrication apparatus 100D has a fiber separation processing unit 101 that is similar to that in the sheet fabrication apparatus 100 and a fabrication unit 102A. A configuration of the fiber separation processing unit 101 and the ingredient MA processed by the fiber separation processing unit 101 are similar to those in the first embodiment.

The fabrication unit 102A includes a classification unit 510, a sorting unit 530, a loosening unit 550, an additive supply unit 52, and a sheet shaping unit 560. The fabrication unit 102A fabricates the sheet SP by processing materials obtained by the fiber separation processing unit 101. At least a part (for example, the classification unit 510 or a combination of the classification unit 510 and the sorting unit 530) of the fabrication unit 102A corresponds to the working unit.

The classification unit 510 separates and removes resin particles and ink particles from the fiber separated articles MC. An air flow-type classification machine is used as the classification unit 510. The air flow-type classification machine is designed to cause a spinning air flow and perform separation by centrifugal force and the sizes and the densities of objects to be classified and can adjust classification points by adjusting the speed of the air flow and the centrifugal force. Specifically, a cyclone, an elbow jet, an Eddy classifier, or the like is used as the classification unit 510. In particular, the cyclone can suitably be used as the classification unit 510 due to its simple structure. Hereinafter, a case in which the cyclone is used as the classification unit 510 will be described.

Although the classification unit 510 corresponds to the classification unit of the invention, a combination of the classification unit 510 and the sorting unit 530, which will be described later, may be regarded as the classification unit of the invention.

The classification unit 510 has an inlet port 511, a cylindrical portion 512 to which the inlet port 511 is connected, and an inverted conical portion 513 that is located below the cylindrical portion 512 and continues to the cylindrical portion 512. Also, the classification unit 510 has a lower discharge port 514 that is provided at a lower center of the inverted conical portion 513 and an upper discharge port 515 that is provided at an upper center of the cylindrical portion 512. A pipe 521 through which the fiber separated articles MC are transported from the fiber separation unit 20 is connected to the inlet port 511.

In the classification unit 510, the air flow that carries the fiber separated articles MC introduced from the inlet port 511 is changed into peripheral motion at the cylindrical portion 512 with an outer diameter of about equal to or greater than 100 mm and equal to or less than 300 mm. In this manner, centrifugal force is applied to the fiber separated articles MC introduced, and the fiber separated articles MC are separated into first classified articles (fiber 2 and non-fiber separated pieces 4) and second classified articles (resin particles and ink particles) that are smaller the first classified articles and that have lower density than that of the first classified articles. The first classified articles are discharged from the lower discharge port 514, passes through the transport unit 522, and are introduced into the inlet port 531 of the sorting unit 530. Meanwhile, the second classified articles pass a pipe 523 from the upper discharge port 515 and are discharged to the outside of the classification unit 510. Since the resin particles are discharged to the outside by the classification unit 510, it is possible to prevent the resin from being excessive with respect to the fiber separated articles MC even if the resin is supplied by the additive supply unit 52, which will be described later.

Note that the description has been given on the assumption that the first classified articles and the second classified articles are separated by the classification unit 510, the first classified articles and the second classified articles cannot completely be separated. First classified articles that are relatively small or have lower density may be discharged to the outside along with the second classified articles in some cases. Second classified articles that have relatively high density or have been entangled with the first classified articles may be introduced into the sorting unit 530 along with the first classified articles. In a case in which the ingredient is pulp sheets or the like rather than old paper, the classification unit 510 may not be provided as the sheet fabrication apparatus since articles corresponding to the second classified articles are not contained therein. Therefore, articles to be introduced into the sorting unit 530 are not only articles classified by the classification unit 510. Thus, articles that have passed through the fiber separation unit 20 and are to be introduced into the sorting unit 530 will be referred to as "fiber separated articles MC after fiber separation processing", and it is assumed that a small amount of resin particles, ink particles, and the like may be contained in addition to the loosened fiber and the non-fiber separated pieces in some cases, in the sixth embodiment.

The sorting unit 530 sorts the first classified articles classified by the classification unit 510 into "first sorted articles (passing articles)" that pass through the openings of the sorting unit 530 and "second sorted articles (remaining articles)" that do not pass through the openings in the air. The sorting unit 530 can have a configuration that is similar to that of the sorting unit 530 (FIG. 1), for example. That is, the sorting unit 530 sorts components contained in the first classified articles depending on sizes. The sorting unit 530 has a drum unit 532 and a housing unit 533 that accommodates the drum unit 532 therein. The drum unit 532 has a configuration that is similar to that of the drum unit 41.

Among the sorted articles sorted by the sorting unit 530, the first sorted articles that have passed through a mesh of a filter of the drum unit 532 are transferred to the mixing unit 50 via the pipe 525. The second sorted articles that have not passed through the mesh of the filter are returned from a discharge port 534 to the fiber separation unit 20 via a pipe 524 that serves as a returning pipe. Specifically, the drum unit 532 is a cylindrical filter that is driven to rotate by a motor. A metal net, expanded metal that is obtained by expanding a metal plate with cut lines, or a punching metal obtained by forming holes in a metal plate with a press machine, for example is used as a net of the drum unit 532.

Note that the configuration of sorting and separating the first sorted articles from the second sorted substances using the sheet fabrication apparatus 100D, that is, the configuration of the classification unit is not limited to the sorting unit 530. For example, the sorting unit 530 may be formed of a classification machine that classifies the fiber separated articles obtained through the fiber separation by the fiber separation unit 20. A cyclone classification machine, an elbow jet classification machine, or an Eddy classifier, for example, can be used as the classification machine. It is possible to sort and separate the first sorted articles from the second sorted articles by using such classification machine. Further, it is possible to realize a configuration of separating and removing articles to be removed, which include relatively small fiber separated articles or fiber separated articles with low density (such as resin particles, a colorant, and an additive), with the aforementioned classification machine. For example, a configuration of removing fine particles contained in the first sorted articles from the first sorted articles with the classification machine may be employed. In this case, a configuration in which the second sorted articles are returned to the fiber separation unit 20, for example, remaining articles are collected by a dust collecting unit (not illustrated), and the first sorted articles excluding the remaining articles are sent to the pipe 7 can be employed.

The first sorted articles that have passed through the openings of the sorting unit 530 are transported to an inlet port 551 of a loosening unit 550 through a pipe 525. The additive supply unit 52 that supplies resin for bonding fiber pieces (fiber separated articles MC) is provided at the pipe 525.

A configuration of the additive supply unit 52 and resin (additive) that is added by the additive supply unit 52 are similar to those in the first embodiment.

The additive supply unit 52 supplies the additive to the pipe 525 in the air. That is, the additive containing resin is supplied to a path through which the first sorted articles are directed from the sorting unit 530 to the loosening unit 550 (between the sorting unit 530 and the loosening unit 550) by the additive supply unit 52.

The loosening unit 550 loosens the entangled first sorted articles. Further, the loosening unit 550 loosens fiber that is contained in the additive that is supplied from the additive supply unit 52. The loosening unit 550 uniformly deposit the first sorted articles and the additive on the piling unit 562, which will be described later.

The loosening unit 550 is a rotating-type filter that rotates using power of a motor (not illustrated), for example. The "filter" that is used as the loosening unit 550 may not have a function of sorting specific targets. That is, the "filter" used as the loosening unit 550 means a filter provided with a net unit 552 that has a plurality of openings and may discharge all the fiber separated articles MC and the additive introduced to the loosening unit 550 from the openings to the outside.

The loosening unit 550 includes the net unit 552. The net unit 552 of the loosening unit 550 has a plurality of openings. The size of the openings of the net unit 552 is equal to or greater than the size of the openings of the drum unit 532. That is, the size of the openings is the same as the size of the openings of the drum unit 532 or is greater than the size of the openings of the drum unit 532. However, an upper limit of the size of the openings is 5 mm. It is possible to loosen lumps of entangled fiber without causing the lumps to pass therethrough by setting the size of the openings to be equal to or less than 5 mm.

Since the first sorted articles that have passed through the openings of the drum unit 532 can pass through the openings of the net unit 552, the openings of the net unit 552 do not clog. Even if there are fiber and resin entangled in the pipe 525 after passing through the openings of the drum unit 532, the fiber and the resin are loosened when the fiber and the resin pass through the openings of the net unit 552. Therefore, mixture that has passed through the openings of the net unit 552 is deposited on the piling unit 562, which will be described later, with a uniform thickness and density. Note that in a case in which the openings of the drum unit 532 have the same size as that of the openings of the net unit 552, the same nets can be used for the drum unit 532 and the net unit 552. In a case in which the openings of the drum unit 532 are set to be larger than the openings, it is possible to reduce a probability of clogging of the openings. Note that there are little remaining articles that cannot pass through the openings and remain in the loosening unit 550 since all or almost all the first sorted articles introduced into the loosening unit 550 pass through the openings. Therefore, the loosening unit 550 does not have a part corresponding to the discharge port 535 of the sorting unit 530 and does not have a flow path through which the fiber separated articles MC that do not pass through the loosening unit 550 are returned to the fiber separation unit 20. That is, there is no flow path that communicates between the loosening unit 550 and the fiber separation unit 20.

Note that "the size of the openings" is an area of the openings in a state in which the drum unit 532 and the net unit 552 are developed in a case in which the drum unit 532 and the net unit 552 have cylindrical shapes. In a case in which the shape of the openings is a circular shape, "the size of the openings" may be a diameter of the openings. "The size of the openings" may be a dimension of a part with the largest dimension in a case of a shape other than a square shape or a circular shape. Note that "equal to or greater than the openings" means that the size of the openings is the same or greater than the size.

The mixture of the first sorted articles (fiber) and the additive that have passed through the sorting unit 530 is introduced from the inlet port 551 to the loosening unit 550 in a state in which the loosening unit 550 is rotating. The mixture that has been introduced into the loosening unit 550 moves to the side of the net unit 552 by centrifugal force. The mixture that is introduced into the loosening unit 550 may contain entangled fiber and resin in some cases, and the entangled fiber and resin are loosened by the net unit 552 in the air. Then, the loosened fiber and additive pass through the openings of the net unit 552. The fiber and the resin that have passed through the openings pass through the air and are uniformly deposited on the piling unit 562, which will be described later.

The fiber separated articles MC and the additive that have passed through the openings of the loosening unit 550 are deposited on the piling unit 562 of the sheet shaping unit 560. The sheet shaping unit 560 has the piling unit 562, a stretching roller 563, a heater roller 565, a tension roller 567, and a winding roller 571. The sheet shaping unit 560 shapes the sheet using the fiber separated articles MC and the additive that have passed through the loosening unit 550. Hereinafter, the sheet shaping unit 560 will be specifically described.

The piling unit 562 of the sheet shaping unit 560 receives and deposits the fiber separated articles MC and the additive that have passed through the openings of the loosening unit 550. The piling unit 562 is located below the loosening unit 550. The piling unit 562 receives the fiber separated articles MC and the additive that have passed through the openings and is a mesh belt, for example. A mesh that is stretched by the stretching roller 563 is formed at the mesh belt. The piling unit 562 moves by the stretching roller 563 spinning. A web with a uniform thickness is formed on the piling unit 562 by the fiber separated articles MC and the additive continuously dropping from the loosening unit 550 and piling up while the piling unit 562 continuously moves.

Note that a suctioning device that is located below the loosening unit 550 via the piling unit 562 and causes an air flow directed downward (an air flow directed from the loosening unit 550 to the piling unit 562) may be provided although not illustrated in the drawing. In this manner, it is possible to suction the fiber separated articles MC and the additive dispersed in the air and to increase a speed of discharge from the loosening unit 550. As a result, it is possible to enhance producibility of the sheet fabrication apparatus 100D. It is possible to form a down flow in the dropping path of the fiber separated articles MC and the additive by the suctioning device and to prevent the fiber separated articles MC and the additive from being entangled during the dropping.

A material of the mesh belt used as the piling unit 562 of the sheet shaping unit 560 is metal, resin, a non-woven cloth, or the like. A hole diameter (diameter) of the mesh belt is equal to or greater than 60 μm and equal to or less than 250 μm, for example. If the hole diameter of the mesh belt is less than 60 μm, it may be difficult to form a stable air flow with the aforementioned suctioning device in some cases. If the hole diameter of the mesh belt is greater than 250 μm, fiber may enter the mesh and irregularity of the surface of the fabricated sheet may increase in some cases.

The fiber separated articles MC and the additive deposited on the piling unit 562 of the sheet shaping unit 560 are heated and pressurized by passing through the heater roller 565 with the movement of the piling unit 562. The resin contained in the additive functions as a binder by being heated, binds the fiber, thins the fiber by pressurizing the fiber, further causes the fiber to pass through a calendar roller, which is not illustrated in the drawing, and smooths the surface thereof, and the sheet SP is thus shaped. The sheet SP is obtained by working the fiber obtained from the ingredient MA into a long sheet shape and corresponds to a state in which the sheet S in the first embodiment is not cut by the cutting unit 90. In the example illustrated in the drawing, the sheet SP is wound around the winding roller 571.

The sheet fabrication apparatus 100D has the first chamber 410, the first sensor unit 411, and the first conditioning unit 415. Configurations thereof are similar to those in the sheet fabrication apparatus 100.

The sheet fabrication apparatus 100D has a second chamber 440 (second case body) that accommodates at least a part of the fabrication unit 102A. The second chamber 440 is a hollow case body and is formed into a box shape, for example, and the fabrication unit 102A is accommodated in a second space 440a that is an inner space of the second chamber 440.

The second air conditioning unit 425 that adjusts the temperature and the humidity in the second space 440a is arranged in the second chamber 440. The second sensor unit 421 that measures the temperature and the humidity in the second space 440a is provided in the second chamber 440. Configurations of the second sensor unit 421 and the second air conditioning unit 425 are similar to those in the sheet fabrication apparatus 100.

The control device 110 included in the sheet fabrication apparatus 100D can execute the control described in the first and second embodiments. That is, it is possible to improve efficiency of the processing of micronizing the ingredient MA by the control unit 150 driving the first air conditioning unit 415 on the basis of the measurement results of the second sensor unit 421. Also, it is possible to exclude or reduce influences of static electricity in a case in which the fiber separated articles MC that are micronized articles obtained from the ingredient MA are processed and transported by the fabrication unit 102A. Therefore, it is possible to further improve efficiency of the processing performed by the fabrication unit 102A.

7. Other Embodiments

The aforementioned respective embodiments are just specific modes of performing the invention described in the claims and are not intended to limit the invention, and the invention can be performed in various modes as described below, for example, without departing from the gist thereof.

For example, although the aforementioned respective embodiments have been described on the assumption that the first air conditioning unit 415 is designed to adjust the temperature in the first space 410a that is a closed space, the invention is not limited thereto. It is only necessary for the first air conditioning unit 415 to be able to adjust a temperature in an environment of the rough grinding unit 12 and/or the fiber separation unit 20 corresponding to the micronizing unit. For example, a configuration in which cold wind or warm wind is made to blow against the rough grinding unit 12 and/or the fiber separation unit 20 may be employed. In this case, the rough grinding unit 12 and the fiber separation unit 20 may be mounted in an opened space, for example, rather than being accommodated in the first space 410a. In this case, it is only necessary for the first sensor unit 411 to measure a temperature in a region against which the first air conditioning unit 415 causes cold air to blow, or to measure a temperature at a location from which the cold winter is made to blow. The second air conditioning unit 425 is similarly not limited to the air conditioning unit that adjusts the temperature and the humidity in the closed space in which the working unit is mounted and may cause warm wind or humidifying air to blow against the working unit.

The sheet fabrication apparatuses 100, 100A, 100B, 100C, and 100D may include the respective parts in the process of fabricating the sheet, for example, a humidifier that humidifies the fiber separation processing unit 101 and the fabrication units 102 and 102A in addition to the humidity adjustment unit 78. The humidifier humidifies the ingredient roughly ground by the rough grinding unit 12, the fiber separated articles obtained by the fiber separation unit 20, the first sorted articles sorted by the sorting unit 40, the first web W1 formed by the first web formation unit 45, the mixture mixed by the pipe 54 and the mixing blower 56, and the like, for example. As the humidifier, a steam-type humidifier, a warm wind vaporizing humidifier, an ultrasonic humidifier, or the like is exemplified. For example, the humidifier may supply humidifying air with high humidity or may supply fine water particles (mist).

The sheet fabrication apparatuses 100, 100A, 100B, 100C, and 100D may have configurations of fabricating not only the sheets S and SP but also products in a board form or a web form that are formed by a hard sheet or laminated sheets. The products are not limited to paper and may be a non-woven cloth. Characteristics of the sheets S and SP are not particularly limited, and the sheet may be paper that can be used as recording paper for the purpose of writing or printing (for example, so-called PPC paper) or may be wall paper, wrapping paper, color paper, drawing paper, Kent paper, or the like. In a case in which the sheet S is a non-woven cloth, the sheet S may be a fiber board, tissue paper, kitchen paper, a cleaner, a filter, a liquid absorbing material, a sound absorbing member, a buffer material, a mat, or the like as well as a typical non-woven cloth.

The entire disclosure of Japanese Patent Application No. 2017-244243, filed Dec. 20, 2017 is expressly incorporated by reference herein.

What is claimed is:

1. A fiber ingredient reproduction apparatus comprising:
a micronizing unit configured to micronize an ingredient;
a first measurement unit configured to measure a temperature in a first chamber housing the micronizing unit;
a first air conditioner configured to adjust the temperature in the first chamber;
a classification unit that classifies the micronized ingredients, the classification unit being positioned outside the first chamber;
a second measurement unit configured to measure a temperature, a humidity, or both a temperature and a humidity at a mounted position of the classification unit; and
a control unit configured to control the first air conditioner based on a measurement result of the first measurement unit, the second measurement unit, or both the first measurement unit and the second measurement unit.

2. The fiber ingredient reproduction apparatus according to claim 1,
wherein the control unit is configured to operate the first air conditioner based on the measurement result of the second measurement unit.

3. The fiber ingredient reproduction apparatus according to claim 2,
wherein the second measurement unit is configured to measure a temperature and a humidity at the mounted position of the classification unit, and
wherein the control unit is configured to set a target temperature in the first chamber based on the temperature and the humidity measured by the second measurement unit and the control unit is configured to operate the first air conditioner in accordance with the set target temperature.

4. The fiber ingredient reproduction apparatus according to claim 3,
wherein the control unit is configured to obtain a dew point temperature at the mounted position of the blade based on the measurement result of the second measurement unit and the control unit is configured to set the target temperature in the first chamber to a temperature that is equal to or less than the dew point temperature.

5. The fiber ingredient reproduction apparatus according to claim 1, further comprising:
a second air conditioner configured to adjust a temperature and a humidity in a second chamber in which the classification unit is mounted,
wherein the second measurement unit is configured to measure a temperature, a humidity, or a temperature and a humidity in the second chamber, and
wherein the control unit is configured to control the second air conditioner based on target values set in advance for the temperature and the humidity in the second chamber and the measurement result of the second measurement unit.

6. The fiber ingredient reproduction apparatus according to claim 1,
wherein the micronizing unit includes a shredding device, a fiber separation machine, or a shredding device and a fiber separation machine, the shredding device being configured to shred the ingredient in a sheet form, and the fiber separation machine being configured to perform fiber separation on the ingredient to obtain the ingredient in a fiber form.

7. The fiber ingredient reproduction apparatus according to claim 1, further comprising:
a housing defining the first chamber and accommodating the micronizing unit,
wherein the first measurement unit is configured to measure the temperature in the first chamber that is an inner space of the first housing.

8. The fiber ingredient reproduction apparatus according to claim 1, further comprising:
a second housing defining a second chamber and accommodating the classification unit,
wherein the second measurement unit is configured to measure a temperature, a humidity, or a temperature and a humidity in an inner space of the second housing.

* * * * *